(12) United States Patent
Seol et al.

(10) Patent No.: US 9,591,645 B2
(45) Date of Patent: Mar. 7, 2017

(54) METHOD AND APPARATUS FOR OPERATING CONTROL CHANNELS FOR BEAMFORMING-BASED WIRELESS COMMUNICATION

(71) Applicant: Samsung Electronics Co., Ltd, Gyeonggi-do (KR)

(72) Inventors: Ji-Yun Seol, Gyeonggi-do (KR); Tae-Young Kim, Gyeonggi-do (KR); Jeong-Ho Park, Seoul (KR); Hyun-Kyu Yu, Gyeonggi-do (KR); Su-Ryong Jeong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

(21) Appl. No.: 13/769,801

(22) Filed: Feb. 18, 2013

(65) Prior Publication Data

US 2013/0215844 A1 Aug. 22, 2013

(30) Foreign Application Priority Data

Feb. 17, 2012 (KR) ........................ 10-2012-0016210

(51) Int. Cl.
*H04B 7/06* (2006.01)
*H04B 7/08* (2006.01)
(Continued)

(52) U.S. Cl.
CPC ........ *H04W 72/046* (2013.01); *H04B 7/0695* (2013.01); *H04B 7/088* (2013.01);
(Continued)

(58) Field of Classification Search
CPC ..... H04L 5/0007; H04L 5/0053; H04L 1/004; H04L 1/0056; H04L 1/1614;
(Continued)

(56) References Cited

U.S. PATENT DOCUMENTS 7,453,832 B2 * 11/2008 Steer et al. ................... 370/278
8,254,481 B1 * 8/2012 McCloskey et al. ......... 375/260
(Continued)

FOREIGN PATENT DOCUMENTS

EP 2264913 A1 12/2010
KR 10-2011-0061666 6/2011
(Continued)

OTHER PUBLICATIONS

International Search Report dated May 30, 2013 in connection with International Patent Application No. PCT/KR2013/001266, 3 pages.
(Continued)

*Primary Examiner* — Ayaz Sheikh
*Assistant Examiner* — Debebe Asefa

(57) ABSTRACT

Provided is a method and apparatus for operating a control channel in a beamforming-based wireless communication system. The provided method includes acquiring information indicating a best Base Station (BS) receive beam for Uplink (UL) communication; determining a control channel region for UL control channels in a UL interval considering the best BS receive beam, the control channel region being a predetermined region that is mapped to the best BS receive beam; and exchanging information about the control channel between a BS and a Mobile Station (MS) through the control channel region.

34 Claims, 13 Drawing Sheets

(51) Int. Cl.
  *H04L 5/00* (2006.01)
  *H04W 72/04* (2009.01)
  *H04W 72/00* (2009.01)
(52) U.S. Cl.
  CPC ............ *H04B 7/063* (2013.01); *H04L 5/0053* (2013.01); *H04W 72/00* (2013.01); *H04W 72/04* (2013.01)
(58) Field of Classification Search
  CPC ... H04L 1/1812; H04L 1/1896; H04L 5/0055; H04W 72/042; H04W 28/04; H04W 72/0406; H04B 7/0695; H04B 7/088; H04B 7/063
  USPC ............................ 370/254–350; 709/201–213
  See application file for complete search history.

(56) References Cited

U.S. PATENT DOCUMENTS

| | | | |
|---|---|---|---|
| 8,739,013 B2 * | 5/2014 | Chung et al. ................. | 714/807 |
| 8,743,724 B2 * | 6/2014 | Kwon .................... | H04B 7/026 370/252 |
| 2009/0318157 A1 | 12/2009 | Hoshino et al. | |
| 2011/0128939 A1 | 6/2011 | Lim et al. | |
| 2012/0057558 A1 * | 3/2012 | Prasad ................ | H04W 52/346 370/329 |
| 2012/0113834 A1 * | 5/2012 | Hunzinger .................... | 370/252 |
| 2013/0010694 A1 * | 1/2013 | Yu et al. ........................ | 370/328 |

FOREIGN PATENT DOCUMENTS

| WO | WO 2011/087272 A2 | 7/2011 |
|---|---|---|
| WO | WO 2011/136559 A2 | 11/2011 |

OTHER PUBLICATIONS

Written Opinion of the International Searching Authority dated May 30, 2013 in connection with International Patent Application No. PCT/KR2013/001266, 5 pages.

* cited by examiner

METHOD AND APPARATUS FOR OPERATING CONTROL CHANNELS FOR BEAMFORMING-BASED WIRELESS COMMUNICATION

CROSS-REFERENCE TO RELATED APPLICATION(S) AND CLAIM OF PRIORITY

The present application is related to and claims the benefit under 35 U.S.C. §119(a) of a Korean Patent Application No. 10-2012-0016210 filed on Feb. 17, 2012 in the Korean Intellectual Property Office, the entire disclosure of which is incorporated herein by reference.

TECHNICAL FIELD

The present disclosure relates generally to a wireless communication system operating based on beamforming, and more particularly, to a method and apparatus for efficiently transmitting and receiving Uplink (UL) and Downlink (DL) control channels for a plurality of Mobile Stations (MSs).

BACKGROUND

Wireless communication systems have been developed to support higher data rate in order to meet the ever-increasing demand for wireless data traffic. For an increase in data rate of the wireless communication systems, technology development has been carried out based on communication technologies such as Code Division Multiple Access (CDMA), Orthogonal Frequency Division Multiple Access (OFDMA) and Multiple Input Multiple Output (MIMO), mainly to improve the spectral efficiency. However, the surging demand for wireless data traffic may not be fully met only with these spectral efficiency improvement technologies.

Recently, the increasing demand for smart devices such as smart phones and tablet PCs and the explosive growth of applications that operate on the smart devices and require a lot of traffic have further accelerated the demand for wireless data traffic. One way to meet these demands is to use more frequency resources over a wider frequency band. Therefore, in order to secure a wider frequency band and apply it to wireless mobile communication, it is necessary to consider securing ultra wideband frequencies in a higher frequency domain.

Wireless communication in a millimeter Wave (mmWave) band may suffer from an increase in propagation loss such as a path loss and a return loss due to the frequency characteristics of the mmWave band. As a result, the range of radio waves is reduced causing a decrease in coverage. On the other hand, the wavelength is very short due to the frequency characteristics of the mmWave band, making it easy to apply beamforming that uses a plurality of small antennas. Accordingly, it is possible to seek new ways to increase the range of radio waves and expand the coverage by mitigating the path loss of radio waves by applying beamforming technology to mmWave-band wireless communication.

Transmit beamforming is generally a way to increase the directivity by concentrating the reach areas of radio waves in a specific direction using multiple antennas. Collection of the multiple antennas is referred to as an antenna array, and each antenna included in the array is called an array element. The antenna arrays may be classified into various types including a linear array and a planar array. Use of transmit beamforming may contribute to an increase in the transmission distance due to the increase in directivity of signals, and since almost no signal is transmitted in directions other than a specific direction, transmit beamforming may remarkably reduce signal interference to users other than a specific user.

On the other hand, a receiver may also perform beamforming on received signals using a receive antenna array. This receive beamforming may also increase the sensitivity of received signals incoming in a specific direction by concentrating received radio waves in a specific direction, and block interference signals by excluding signals incoming in directions other than the specific direction from the received signals.

The conventional cellular system basically considers isotropic or omni-directional transmission/reception between a BS and MSs without applying beamforming to control channels that use a small amount of resources. Therefore, the existing researches on the operation of control channels mainly include defining Hybrid Automatic Retransmission reQuest (HARQ) timing rules, which are determined considering the time required for processing of HARQ data, for an Acknowledgement (ACK) Channel (ACKCH) which is a control channel for transmitting Acknowledgement & Non-acknowledgement (ACK/NACK) which is decoding result information about HARQ data; allocating an HARQ feedback resource area; and mapping ACKCHs within the allocated HARQ feedback resource area.

However, in the wireless mobile communication system using the mmWave band, it is necessary to apply beamforming even to UL/DL control channels for the performance improvement and coverage expansion in a beamforming-based operation for overcoming the significant propagation loss and penetration loss which occur due to the channel propagation characteristics of the mmWave band. Therefore, there is a need for technology for effectively applying UL/DL beamforming to UL/DL control channels such as Uplink Ranging Channel (UL RNGCH), UL Feedback Channel (UL FBCH), and DL/UL HARQ FBCH (DL/UL HFBCH), for the additional performance improvement and coverage expansion in the beamforming-based wireless communication system.

SUMMARY

To address the above-discussed deficiencies of the prior art, it is a primary object to provide a method and apparatus for transmitting and receiving information in a communication system.

Another aspect of exemplary embodiments of the present disclosure is to provide a method and apparatus for operating UL and DL control channels in an mmWave-band wireless mobile communication system operating based on beamforming.

Further another aspect of exemplary embodiments of the present disclosure is to provide a method and apparatus for grouping control channels considering best BS transmit/receive beams for an MS in a wireless communication system.

Still another aspect of exemplary embodiments of the present disclosure is to provide a method and apparatus for allocating control channels to each MS considering best BS transmit/receive beams for an MS in a wireless communication system.

In accordance with one aspect of the present disclosure, there is provided a method for operating a control channel in a beamforming-based wireless communication system. The method may include acquiring information indicating a best Base Station (BS) receive beam for Uplink (UL) communication; determining a control channel region for UL control channels in a UL interval considering the best BS receive beam, the control channel region being a predetermined region which is mapped to the best BS receive beam; and exchanging information about the control channel between a BS and a Mobile Station (MS) through the control channel region.

In accordance with another aspect of the present disclosure, there is provided a method for operating a control channel in a beamforming-based wireless communication system. The method may include determining information about a best Base Station (BS) transmit beam for Downlink (DL) communication; determining a control channel region for DL control channels in a DL interval considering the best BS transmit beam, the control channel region being a predetermined region which is mapped to the best BS transmit beam; and exchanging information about the control channel between a BS and a Mobile Station (MS) through the control channel region.

In accordance with further another aspect of the present disclosure, there is provided a communication apparatus for operating a control channel in a beamforming-based wireless communication system. The apparatus may include a transmitter; a receiver; and a controller for controlling the transmitter and the receiver. The controller may acquire information indicating a best Base Station (BS) receive beam for Uplink (UL) communication, and determine a control channel region for UL control channels in a UL interval considering the best BS receive beam, the control channel region being a predetermined region which is mapped to the best BS receive beam. The transmitter and the receiver may transmit or receive information about the control channel through the control channel region.

In accordance with still another aspect of the present disclosure, there is provided a communication apparatus for operating a control channel in a beamforming-based wireless communication system. The apparatus may include a transmitter; a receiver; and a controller for controlling the transmitter and the receiver. The controller may determine information about a best Base Station (BS) transmit beam for Downlink (DL) communication, determine a control channel region for DL control channels in a DL interval considering the best BS transmit beam, and control the transmitter and the receiver to transmit or receive information about the control channel through the control channel region. The control channel region may be a predetermined region which is mapped to the best. BS transmit beam.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication technologies. Preferred embodiments of the present disclosure will now be described in detail with reference to the accompanying drawings. In the following description, specific details such as detailed configuration and components are merely provided to assist the overall understanding of exemplary embodiments of the present disclosure. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

In an mmWave-band wireless communication system operating based on beamforming, beamforming for maximizing beam gain in a DL and a UL is operated to overcome the significant propagation loss and penetration loss that occur due to the channel propagation characteristics of the mmWave band. Beamforming in a DL is performed based on a beam pair that includes BS's transmit beams and MS's receive beams, and includes a process of selecting the best beam pair from among one or more BS transmit beams and MS receive beams that occur in several directions depending on the structure of each of the MS and the BS, and allowing both the MS and the BS to recognize information about the best beam pair. Similarly, beamforming in a UL is performed based on a beam pair that includes MS's transmit beams and BS's receive beams, and information about the best beam pair of one or more MS transmit beams and BS receive beams that occur in several directions depending on the structure of each of the MS and the BS, is shared between the BS and the MS.

Figure 1:
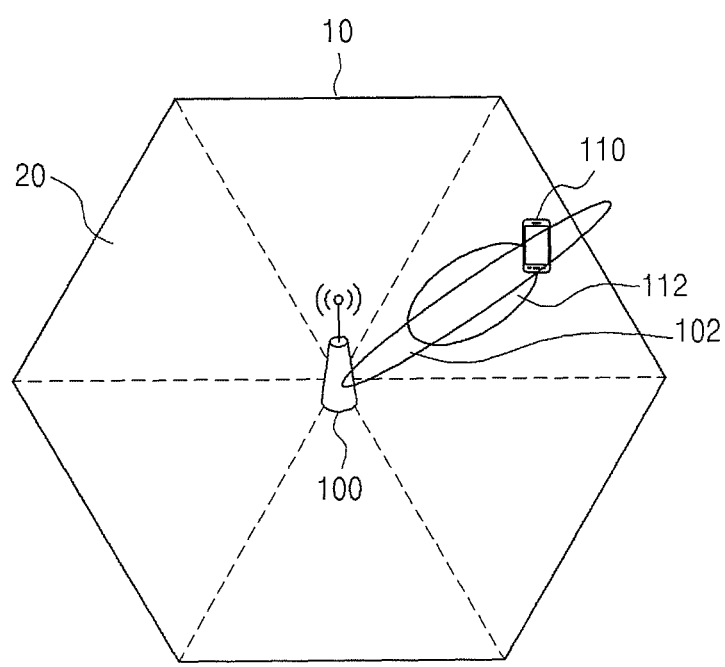
FIG. 1 illustrates a beamforming-based signal transmission/reception scenario according to an embodiment of the present disclosure.

FIG. 1 illustrates a beamforming-based signal transmission/reception scenario according to an embodiment of the present disclosure.

Referring to FIG. 1, a BS 100 has one cell 10, and a service area comprised of one or more sectors 20 corresponding to the cell 10. The number of sectors 20 belonging to one cell 10 is subject to change. It will be assumed herein that multiple beams are operated in each sector 20. In order to support one or more MSs while acquiring beam gain, the BS 100 forms one or more transmit/receive beams in different directions for a DL/UL at the same time, or forms the transmit/receive beams in different directions with a time difference while sweeping them. As an example, the BS 100 forms N receive beams heading in N directions at a time during N time slots. As another example, the BS 100 sequentially forms N receive beams heading in N directions while sweeping them during N slots. Specifically, a first receive beam is formed only in a first slot, a second receive beam is formed only in a second slot, an i-th receive beam is formed only in an i-th slot, and an N-th receive beam is formed only in an N-th slot.

Due to its structural constraints, an MS 110 generally operates a wider beam width with lower beam gain, compared with the BS 100. Depending on its implementation, the MS 110 can support one or more receive/transmit beams for a DL/UL.

Figure 2:
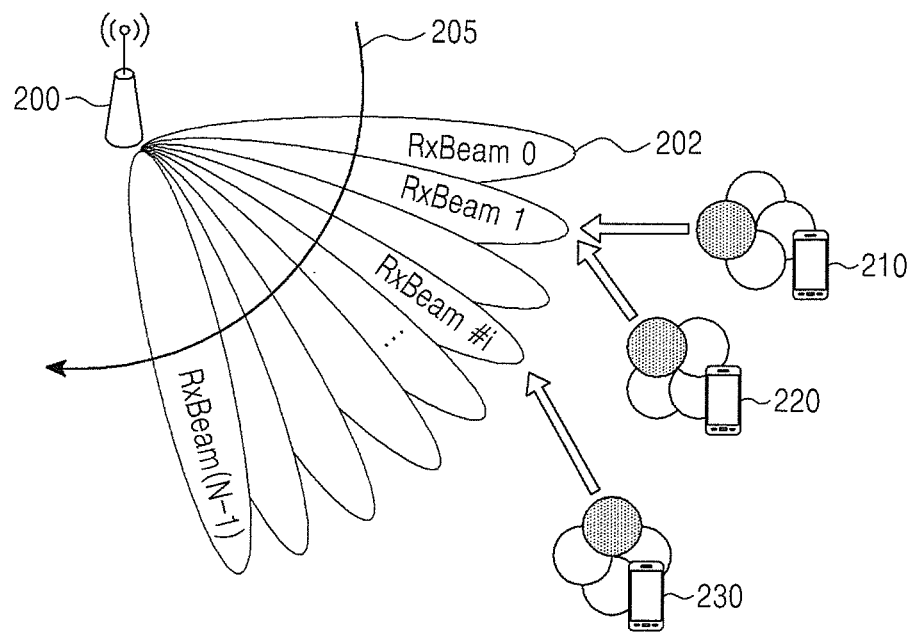
FIG. 2 illustrates beamforming-based UL communication between a BS and MSs according to an embodiment of the present disclosure.

FIG. 2 illustrates beamforming-based UL communication between a BS and MSs according to an embodiment of the present disclosure. In the illustrated example, a BS 200 operates multiple receive beams 202 heading in different directions within one sector, and MSs 210, 220 and 230 each support one or more transmit beams.

Referring to FIG. 2, the BS 200 can form multiple beam-formed signals (i.e., receive beams) in different directions at the same time, or can receive multiple signals through the receive beams while sweeping (205) multiple receive beams heading in different directions continuously in time.

Depending on the implementation for securing the possible maximum beamforming gain under the constraints determined by the shape and complexity, the MSs 210, 220 and 230 can support omni-directional transmission without supporting transmit beamforming, support only one of specific transmit beamforming patterns at a time while supporting transmit beamforming, or simultaneously apply multiple transmit beamforming patterns in different directions while supporting transmit beamforming.

For an MS (not shown) that does not support transmit beamforming, the BS 200 measures the channel quality of a reference signal for each transmit beam of the MS, and selects the beam optimal for the MS from among multiple receive beams of the BS 200 based on the measurement results. In the case of the MSs 210, 220 and 230 supporting transmit beamforming, the BS 200 measures the channel quality of each pair comprised of multiple receive beams of the BS 200 depending on each transmit beamforming pattern of the MSs 210, 220 and 230, selects and manages one, some, or all of the pairs of BS receive beams and MS transmit beams, and schedules an appropriate beam pair to the MSs 210, 220 and 230 depending on the circumstances.

Figure 3:
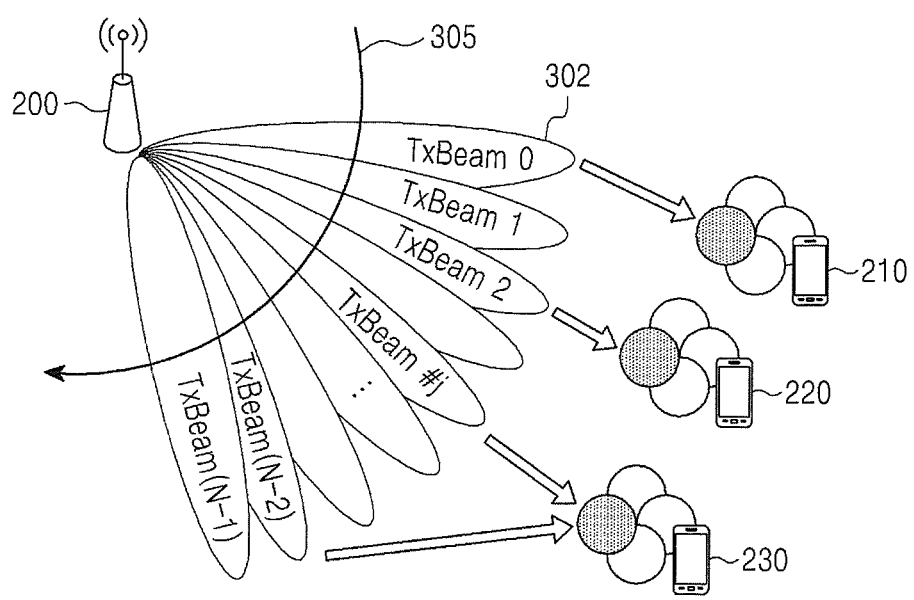
FIG. 3 illustrates beamforming-based DL communication between a BS and MSs according to an embodiment of the present disclosure.

FIG. 3 illustrates beamforming-based DL communication between a BS and MSs according to an embodiment of the present disclosure. In the illustrated example, the BS 200 operates multiple transmit beams 302 heading in different directions for a DL within one sector, and the MSs 210, 220 and 230 support one or more receive beams.

Referring to FIG. 3, the BS 200 can transmit multiple beam-formed signals (i.e., transmit beams) in different directions at the same time, or can transmit multiple signals through transmit beams while sweeping (305) one or more beams heading in different directions continuously in time. Depending on the implementation for securing the possible maximum beamforming gain under the constraints determined by the shape and complexity, the MSs 210, 220 and 230 can support omni-directional transmission without supporting receive beamforming, support only one of specific receive beamforming patterns at a time while supporting receive beamforming, or simultaneously apply multiple receive beamforming patterns in different directions while supporting receive beamforming.

Each of the MSs 210, 220 and 230 measures the channel quality for each transmit beam of the BS 200 from a reference signal that the BS 200 transmits through each transmit beam, and selects the transmit beam optimal for the MSs 210, 220 and 230 based on the measurement results. If any MS (for example, the MS 230) applies receive beamforming that uses multiple receive beams, the MS 230 can measure the channel quality for a pair of each transmit beam of the BS 200 and receive beams of the MS 230, and select the best pairs of BS transmit beams and MS receive beams for a DL based on the measurement results.

As can be seen in FIGS. 2 and 3, for each MS, the BS's best receive beams for UL transmission and the BS's best transmit beams for DL transmission do not always have the same directivity, and BS's receive beam index and transmit beam index, which are scheduled in data transmission and reception, can be different from each other. As an example, while the best BS receive beam of the MS 210 is RxBeam#1, the best BS transmit beam thereof is TxBeam#0; while the best BS receive beam of the MS 220 is RxBeam#1, the best BS transmit beam thereof is TxBeam#2; while the best BS receive beam of the MS 230 is RxBeam#i, the best BS transmit beams thereof are TxBeam#j and #(N−2).

Figure 4:
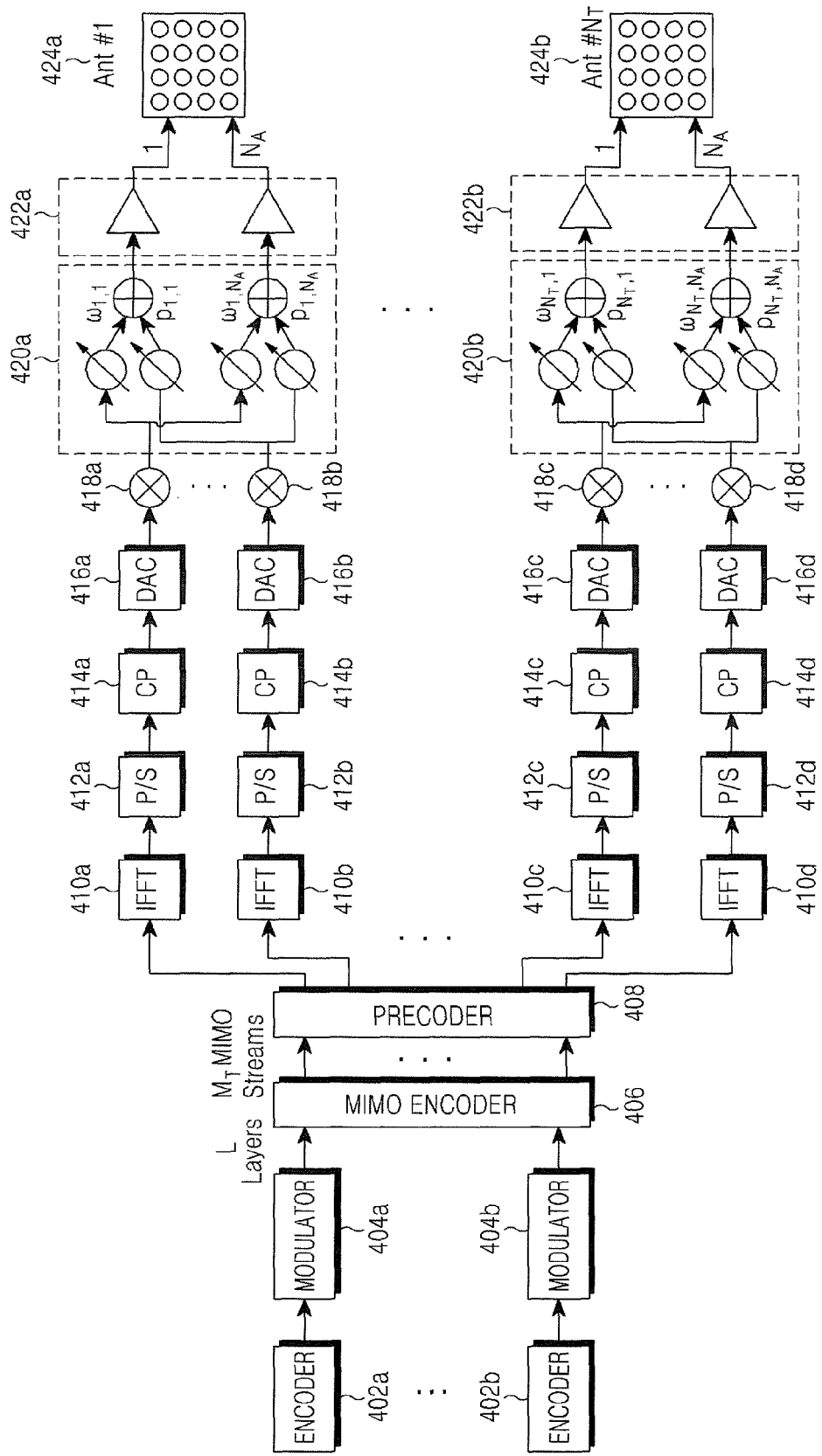
FIG. 4 illustrates a block diagram of a transmitter's physical layer for supporting beamforming according to an embodiment of the present disclosure.

FIG. 4 illustrates a block diagram of a transmitter's physical layer (PHY) for supporting beamforming according to an embodiment of the present disclosure. The illustrated structure can be included in a transmitter configuration of a BS or an MS. Herein, a hybrid structure employing both analog beamforming and digital beamforming is illustrated as an example to show the general beamforming support structure.

Referring to FIG. 4, multiple encoders 402a and 402b encode input information corresponding to L layers, and multiple modulators 404a and 404b map the coded information to modulation symbols. A MIMO encoder 406 converts modulation symbol sequences corresponding to L layers into $M_T$ MIMO streams, and a precoder 408 converts $M_T$ MIMO streams into $N_T \times N_A$ precoded streams corresponding to $N_T$ antenna arrays 424a and 424b and $N_A$ antenna elements included in each antenna array, using a predetermined precoding matrix.

The precoded streams are converted into OFDM symbol sequences after undergoing Inverse Fast Fourier Transform (IFFT) units 410a, 410b, 410c and 410d (410), Parallel to Serial Converters (P/Ss) 412a, 412b, 412c and 412d (412), and Cyclic Prefix (CP) inserters 414a, 414b, 414c and 414d (414), and the OFDM symbol sequences are converted into Radio Frequency (RF) analog signals after undergoing Digital to Analog Converters (DACs) 416a, 416b, 416c and 416d (416) and mixers 418a, 418b, 418c and 418d (418), and then input to phase shifters 420a and 420b (420) and power amplifiers 422a and 422b (422).

The phase shifters 420a and 420b apply phase shift values ω and p corresponding to $N_T$ antenna arrays 424a and 424b and $N_A$ antenna elements to the input analog RF signals, add up them for each antenna element, and deliver the results to the power amplifiers 422a and 422b. The power amplifiers 422a and 422b control amplitudes of the phase-shifted signals corresponding to the $N_T$ antenna arrays 424a and 424b and the $N_A$ antennal elements. The phase shifters 420a and 420b and the power amplifiers 422a and 422b correspond to antenna element-specific beamforming units for transforming analog signals into transmit beams having specific powers in specific directions. The illustrated transmitter structure can secure additional gain by an RF path, which includes IFFT units before DACs, the MIMO encoder 406 and the precoder 408, and can support functions such as multi-user operation, frequency-selective allocation, and multi-beam forming.

Although the transmitter structure including multiple antenna arrays has been illustrated herein, the transmitter can be implemented in a variety of forms including one or more antenna arrays. Generally, a DAC, a mixer (or a frequency converter) and an optional combination of a phase shifter and a power amplifier constitute one RF chain. A transmitter can include one or more RF chains, and the maximum number of interoperable transmit beams is dependent on the number RF chains. As an example, the maximum number of transmit beams may not exceed the number of RF chains included in the transmitter. Depending on their implementation or operational policy, the RF chains can be used for the same or different information or channels. As an example, the first few RF chains can be used for a first type of control channels, the next few RF chains can be used for a second type of control channels, and the remaining RF chains can be used for data channels.

Various embodiments operating beamforming for control channels will be described below. The control channels can be transmitted using the best transmit beams and/or the best receive beams, which are selected by a receiver. Transmission resource areas for control channels, which are mapped to different transmit/receive beams, are allocated depending on the transmit/receive beams. To this end, a resource area for control channels is divided into multiple channel regions that correspond to transmit/receive beams on a one-to-one basis. As an example, a resource area is divided into multiple channel regions corresponding to transmit beams. As another example, a resource area is divided into multiple channel regions corresponding to receive beams. As further another example, a resource area is divided into multiple channel regions corresponding to transmit/receive beam pairs.

Although a structure of a resource area for an Uplink Ranging Channel (UL RNGCH), a UL Feedback Channel (UL FBCH), and a DL/UL HARQ FBCH (DL/UL HFBCH) will be described herein as an example of a resource area for control channels, it should be understood that the present disclosure is not limited to the specific types of control channels.

Figure 5A:
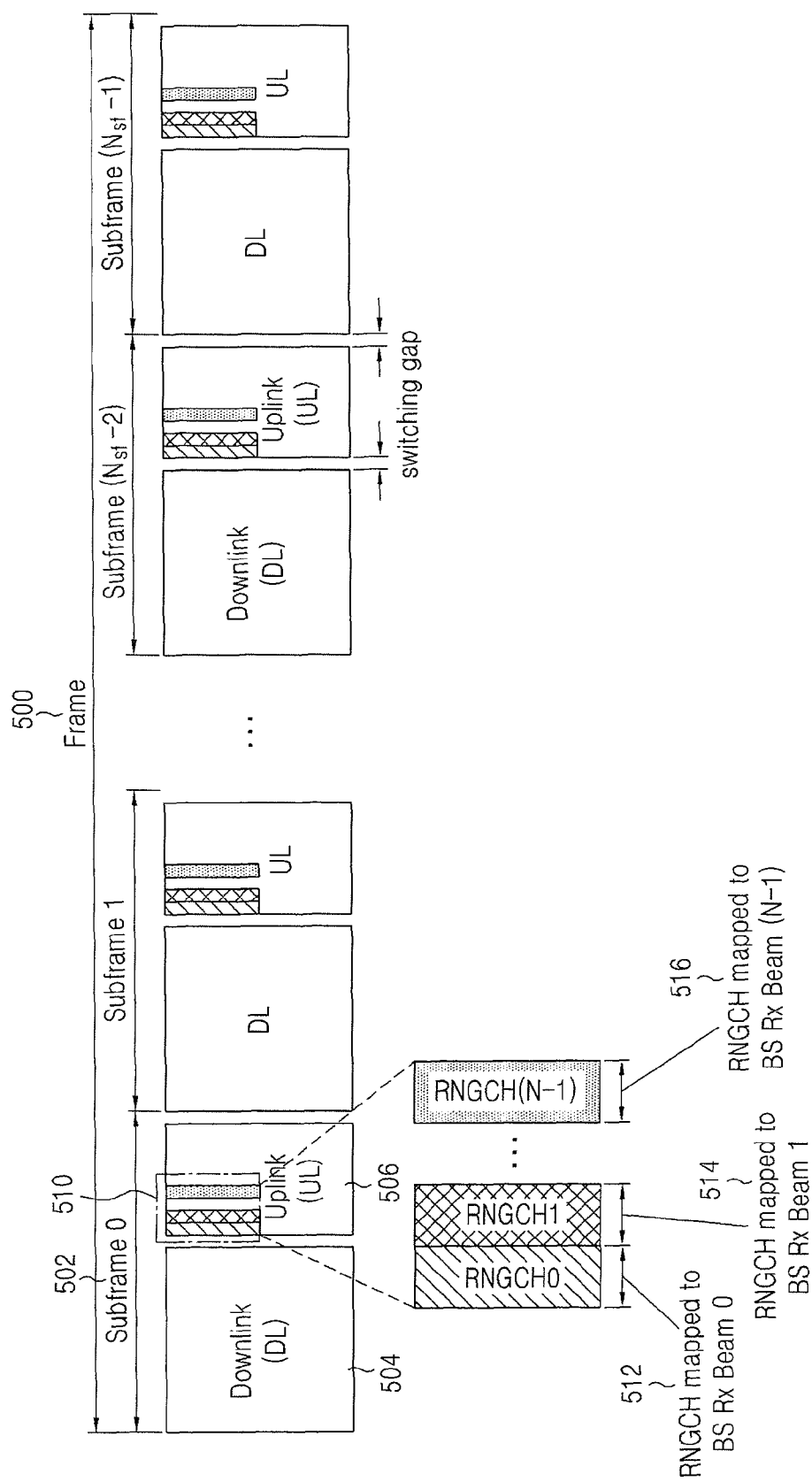
FIGS. 5A and 5B illustrate frame structures for beamformed RNGCHs according to an embodiment of the present disclosure.
Figure 5B:
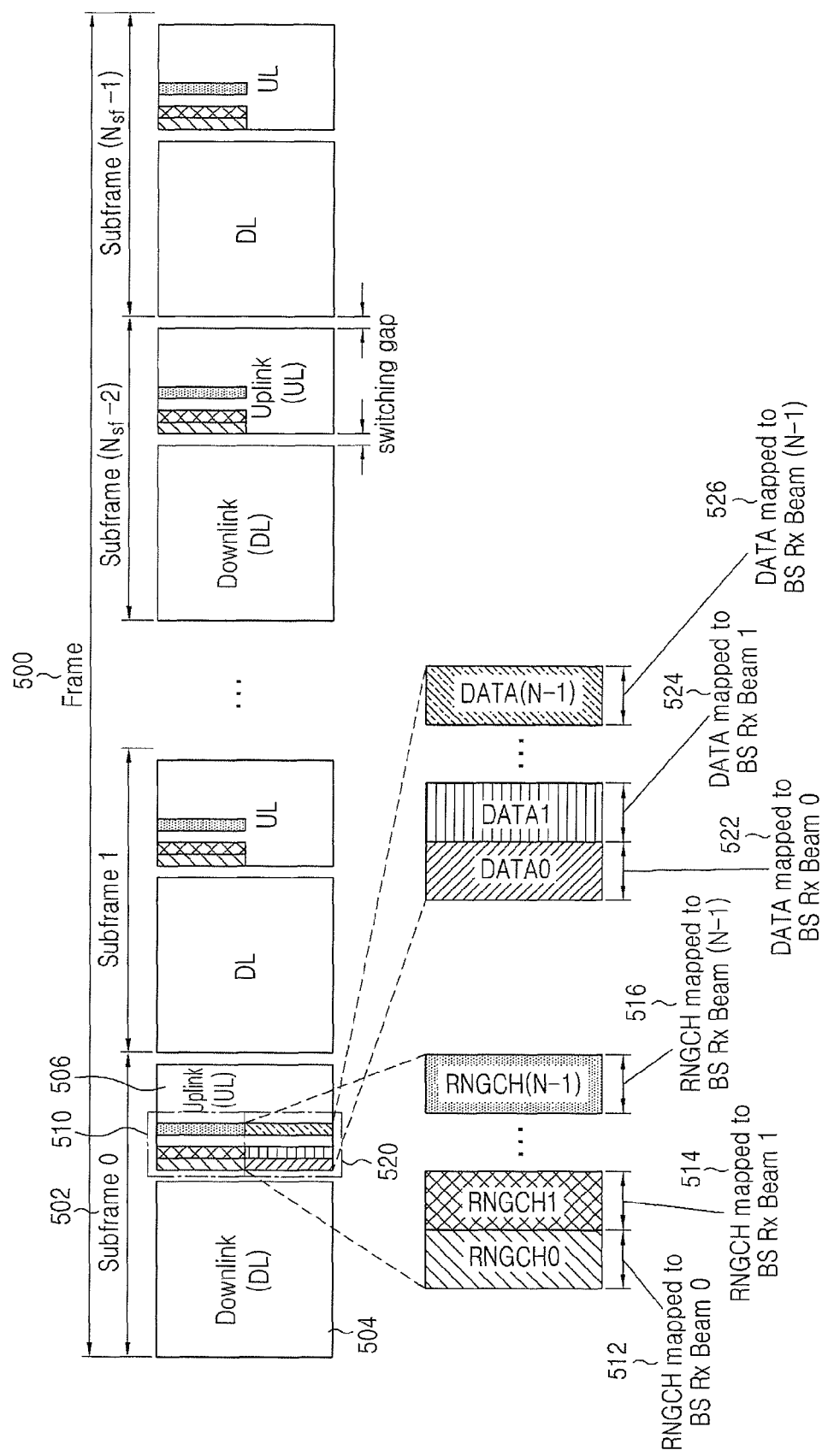

FIGS. 5A and 5B illustrate frame structures for beamformed RNGCHs according to an embodiment of the present disclosure. Although a Time Division Duplex (TDD) frame structure is illustrated herein, the frame structure can have a variety of different forms depending on the duplex mode (i.e., Time Division Duplex (TDD), Frequency Division Duplex (FDD), or Half-duplex FDD (H-FDD), etc.), the maximum number of MS transmit beams and BS receive beams, the form of a reference signal for each beam, and the transmission cycle of a reference signal.

Referring FIG. 5A, a frame 500 is comprised of Nsf subframes 502, and each subframe 502 includes a DL interval 504 and a UL interval 506, which are separated by a switching gap. A predetermined resource area 510 in each UL interval 506 is allocated for transmitting UL control channels such as a Ranging Channel (RNGCH) and a Random Access Channel (RACH).

In the UL interval 506, the resource area 510 allocated for transmission of ranging channels is divided into multiple channel regions 512, 514 and 516, and the channel regions 512, 514 and 516 are mapped to multiple BS receive beams that can be used for UL reception in a BS. The number of channel regions 512, 514 and 516 can be limited to the number of BS receive beams. As an example, the channel regions 512, 514 and 516 occupy the whole or some of a frequency band of the UL interval 506, and are separated in the time domain. Each of the channel regions 512, 514 and 516 refers to one ranging channel region or an RACH region, and can be comprised of one or more slots. Specifically, a first channel region RNGCH0 512 is mapped to a BS receive beam#0, a second channel region RNGCH1 514 is mapped to a BS receive beam #1, and an N-th channel region RNGCH(N−1) 516 is mapped to a BS receive beam #(N−1). As an option, at least some of channel regions can be mapped to one or more BS receive beams to indicate one or more best BS receive beams.

Each of the channel regions 512, 514 and 516 is used to perform UL synchronization during initial network entry, or used to transmit a ranging code (or sequence) on a contention basis by MSs that intend to periodically perform transmission (Tx) adjustment with the BS. An MS transmits a reference signal (i.e., a ranging code) selected to be mapped to each MS transmit beam, using one or more BS's specific receive beams, or repeatedly transmits as many reference signals as the number, N, of BS receive beams. The BS measures the channel quality for each MS's transmit beam with respect to each BS receive beam.

In the example of FIG. 5A, a ranging code mapped to one MS transmit beam is transmitted over several ranging channel regions (i.e., channel regions 512, 514 and 516) that are mapped to different BS receive beams in units of receive intervals for each BS receive beam. The ranging channel regions 512, 514 and 516 for each BS receive beam can each include one or more ranging channels.

An MS recognizes the BS receive beam optimal for the MS (for example, receives information about the best BS receive beam from the BS) through a predetermined procedure, and transmits a ranging code through a ranging channel region corresponding to the best BS receive beam. If an MS has no information about the best BS receive beam or is performing UL beam tracking like in the UL synchronization process during initial network entry, the MS performs beam sweeping on each of the ranging channels not for specific BS receive beams but for all BS receive beams, and the BS can measure the channel quality for a ranging code received through each BS receive beam and select the best BS receive beam for the MS.

So far, a UL RNG or an RACH that is randomly selected from several codes and operated based on the contention between multiple MSs has been described as a reference signal for measuring the channel quality for each UL beam pair for several MSs. A random code or sequence in the UL RNG or RACH is designed considering UL multiple accesses by multiple MSs, and has the anonymous characteristics that it is basically impossible for the BS to immediately determine from which MS detected code or sequence was transmitted. Therefore, different codes (or sequences) can be mapped to each MS transmit beam or a beam ID can be carried on each MS transmit beam so that the BS can distinguish one or more MS's transmit beams, which are transmitted continuously in time, or simultaneously.

As an option, if the resource area 510 occupies some of the frequency band of the UL interval 506, the rest of the frequency band can be used for a control channel(s) that is generated through an RF chain(s), which is different from that of the resource area 510, or for a data channel(s) that is generated through an RF chain(s), which is the same as or different from that of the resource area 510. FIG. 5B illustrates a structure of a resource area 520 that shares the same time interval with the resource area 510 for ranging channels and is distinguished from the resource area 510 in the frequency domain. Although it is assumed herein that only two resource areas 510 and 520 exist in the entire frequency band, it will be apparent to those of ordinary skill in the art that two or more resource areas can be multiplexed in the frequency domain.

Referring to FIG. 5D, the first resource area 510 for ranging channels, as described above, is divided, in the time domain, into multiple channel regions 512, 514 and 516 that are mapped to multiple BS receive beams, and each channel region is mapped to a BS receive beam that the BS can use for UL reception. Similarly, the second resource area 520, which shares the time interval with the first resource area 510 and is distinguished from the first resource area 510 in the frequency domain, is divided, in the time domain, into multiple channel regions 522, 524 and 526 that are mapped to multiple BS receive beams. The channel regions 522, 524 and 526 of the second resource area 520 are mapped to their associated BS receive beams.

In this example, the second resource area 520 is used to carry the data channels. Each channel region is mapped to a different BS receive beam, and used to transmit a UL data burst by an MS that has the BS receive beam as a best BS receive beam. As an example, an MS that has a BS receive beam #1 as a best BS receive beam, can transmit a ranging code to the BS through the second channel region RNGCH1 514 of the first resource area 510. In addition, the MS can transmit a UL data burst to the BS through the second channel region 524 of the second resource area 520.

The BS receives the signal transmitted through each channel region, using a BS receive beam that is mapped to the channel region.

Although only two resource areas 510 and 520 are assumed to be multiplexed in the frequency domain in FIG. 5B, the resource areas 510 and 520 can be multiplexed even in the time domain. If time multiplexing is applied, the resource area 520 for other control channels or data channels can be placed in another time domain, while occupying a frequency band where it is the same as or different from or at least partially overlaps the RNGCH resource area 510 in the UL interval 506. The resource area 520 is divided into multiple channel regions that are mapped to beams in different directions, as described above.

Figure 6A:
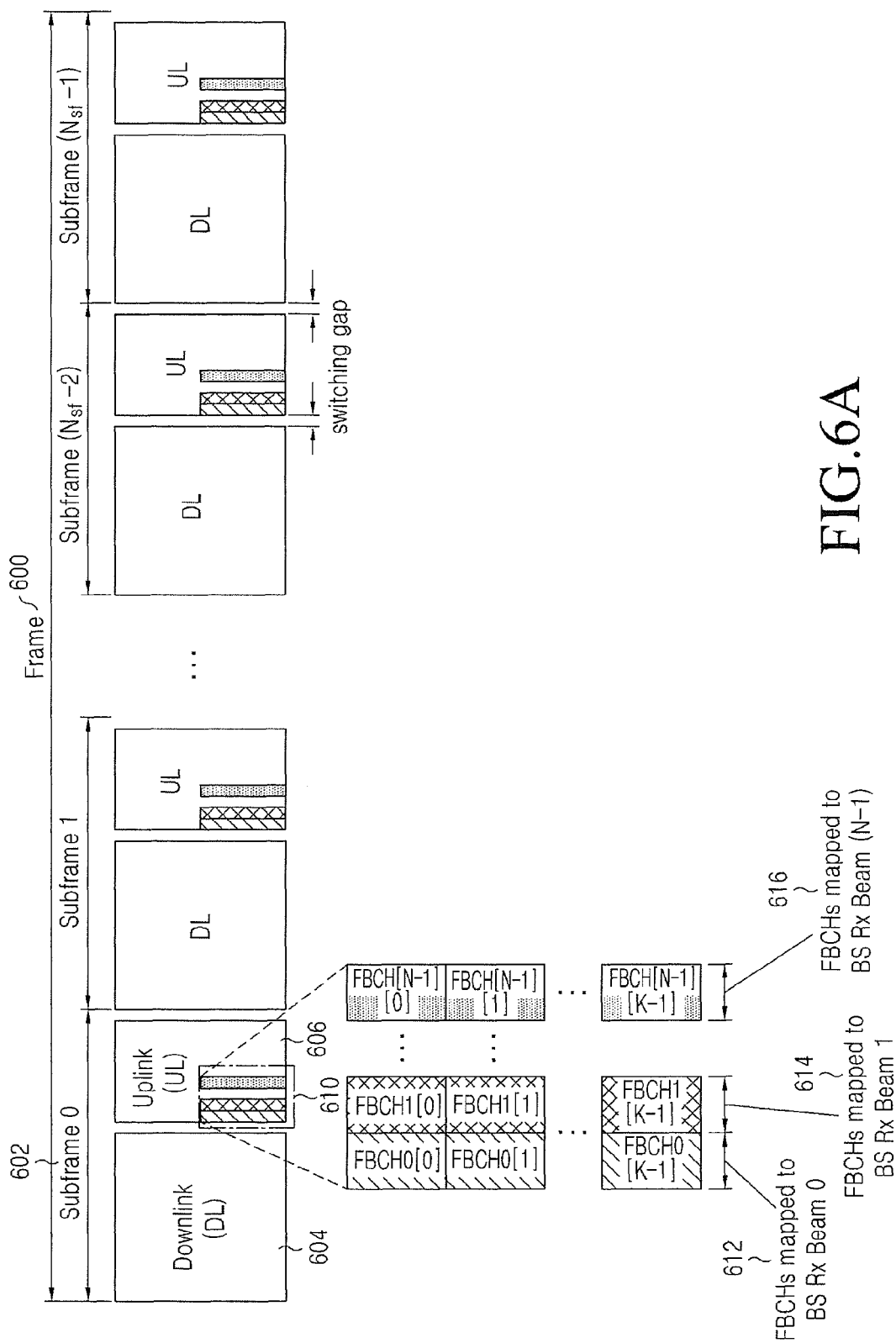
FIGS. 6A and 6B illustrate frame structures for beamformed UL FBCHs according to another embodiment of the present disclosure.
Figure 6B:
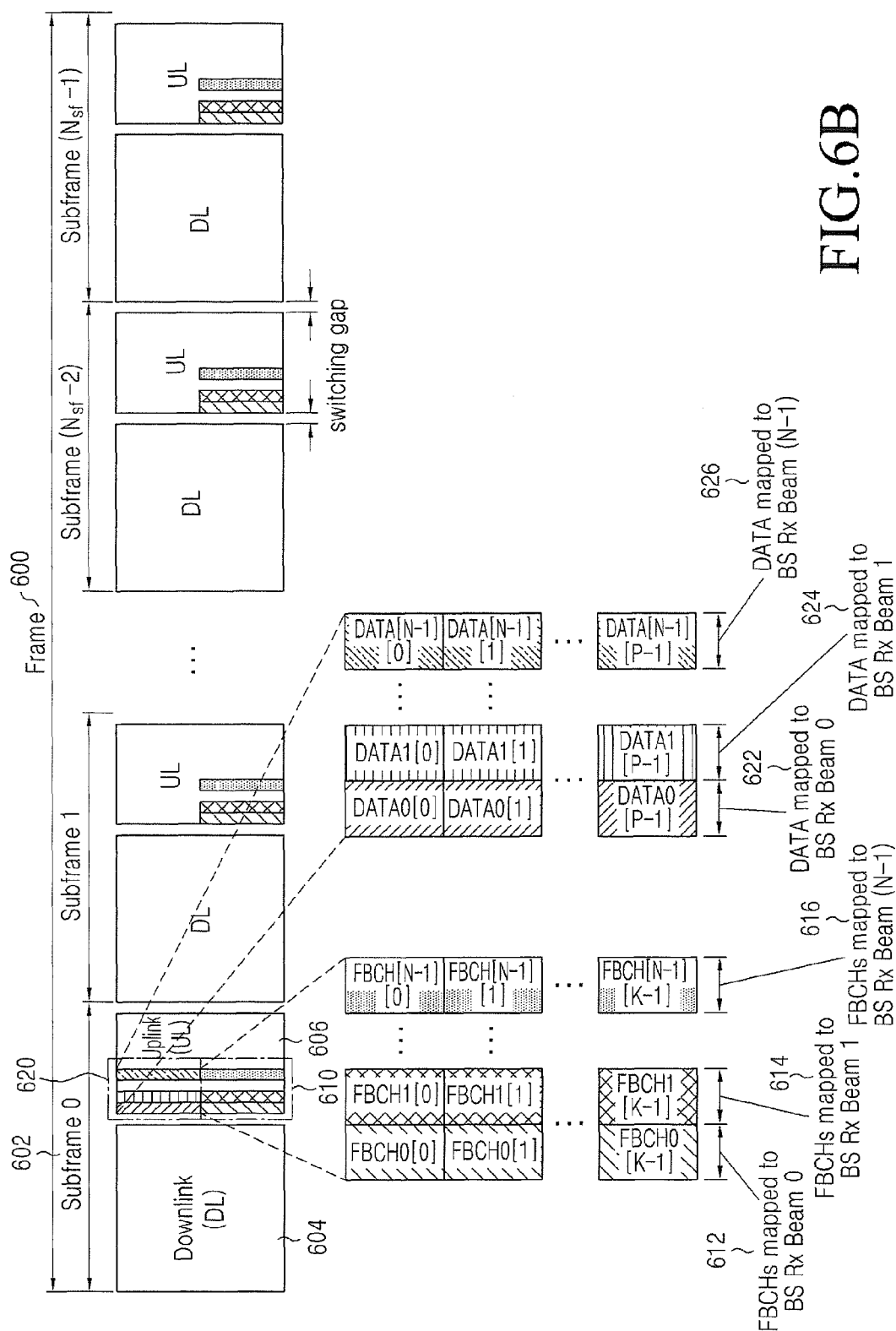

FIGS. 6A and 6B illustrate frame structures for beamformed UL FBCHs according to another embodiment of the present disclosure.

Referring to FIG. 6A, a frame 600 is comprised of Nsf subframes 602, and each subframe 602 includes a DL interval 604 and a UL interval 606, which are separated by a switching gap. A predetermined resource area 610 in each UL interval 606 is allocated for transmitting FBCHs that carry a Carrier to Interference and Noise Ratio (CINR), Received Signal Strength Indicator (RSSI) and Multiple Input Multiple Output (MIMO)-related feedback information. The MIMO-related feedback information indicates at least one of, for example, a MIMO mode, a Precoding Matrix Indication (PMI) and a rank.

In the UL interval 606, the resource area 610 allocated for UL feedback channels is divided into multiple channel regions 612, 614 and 616, and the channel regions 612, 614 and 616 are mapped to multiple BS receive beams that the BS can use for UL reception. The number of channel regions 612, 614 and 616 can be limited to the number of BS receive beams. As an example, the channel regions 612, 614 and 616 occupy the whole or some of a frequency band of the UL interval 606, and are separated in the time domain. Each of the channel regions 612, 614 and 616 refers to one FBCH region. Specifically, a first channel region FBCH0 612 is mapped to a BS receive beam#0, a second channel region FBCH1 614 is mapped to a BS receive beam #1, and an N-th channel region FBCH(N−1) 616 is mapped to a BS receive beam #(N−1). As an option, at least some of channel regions can be mapped to one or more BS receive beams to indicate one or more best BS receive beams.

Multiple MSs located in a cell/sector of a BS can have different best BS receive beams in performing UL transmission/reception. The BS groups MSs having feedback channels that are allocated to the same BS receive beam, and allocates, to the grouped MSs, FBCHs in FBCH regions that are mapped to the same BS receive beam. In the illustrated example, each of the FBCH regions 612, 614 and 616 includes K FBCHs that can be allocated to a maximum of K UEs. In each FBCH region, K FBCHs can be separated in the frequency domain. As an example, FBCH0[k] refers to an FBCH that is included in FBCH0 612 and allocated to a (k+1)-th MS, and FBCH(N−1)[K−1] refers to an FBCH that is included in FBCH(N−1) 616 and allocated to a K-th MS. Each MS can transmit a UL feedback over its FBCH, and the BS can receive the UL feedback using a BS receive beam that is mapped to the FBCH region to which the FBCH belongs.

The BS updates the best BS receive beam in a UL for each MS through beam tracking that is performed at predetermined intervals, or performed periodically or aperiodically depending on the predetermined conditions, and performs scheduling to allocate FBCHs that are mapped to the best BS receive beam for each MS depending on the beam tracking. Depending on the movement of MSs or the change in channel characteristics, the best BS receive beam(s) of each MS can be changed dynamically or semi-dynamically, so that an FBCH allocated to the MS can be newly allocated. The BS provides the FBCH allocation information to the MS.

As an option, if the resource area 610 occupies some of the frequency band of the UL interval 606, the rest of the frequency band can be used for a control channel(s) that is generated through an RF chain(s), which is different from that of the resource area 610, or for a data channel(s) that is generated through an RF chain(s), which is the same as or different from that of the resource area 610. As an example, some lower part of the frequency band of the UL interval 606 can be used for the resource area 510 for ranging channels, and some higher part of the frequency band of the same time interval can be used for the resource area 610 for UL feedback channels.

As another example, as illustrated in FIG. 6B, there can exist a second resource area 620 that shares the same time interval with the first resource area 610 for UL feedback channels, and is distinguished from the first resource area 610 in the frequency domain. Although it is assumed herein that only two resource areas 610 and 620 are included in the entire frequency band, it will be apparent to those of ordinary skill in the art that two or more resource areas can be multiplexed in the frequency domain.

Referring to FIG. 6B, the first resource area 610 for UL feedback channels, as described above, is divided, in the time domain, into multiple channel regions 612, 614 and 616 that are mapped to multiple BS receive beams, and each channel region is mapped to a BS receive beam that the BS can use for UL reception, and includes multiple FBCHs. Similarly, the second resource area 620, which shares the time interval with the first resource area 610 and is distinguished from the first resource area 610 in the frequency domain, is divided, in the time domain, into multiple channel regions 622, 624 and 626 that are mapped to multiple BS receive beams. Each of the channel regions 622, 624 and 626 includes P data bursts, which can be allocated to a maximum of P MSs. The channel regions 622, 624 and 626 of the second resource area 620 are mapped to their associated BS receive beams.

In this example, the second resource area 620 is used to carry the data channels. Each channel region is mapped to a different BS receive beam, and used to transmit a UL data burst by an MS(s) that has the BS receive beam as a best BS receive beam. As an example, an MS that has a BS receive beam #1 as a best BS receive beam, can transmit a UL feedback to the BS through the second channel region FBCH1 614 of the first resource area 610. In addition, the MS can transmit a UL data burst to the BS through a frequency band allocated in the second channel region 624 of the second resource area 620.

The BS receives a signal transmitted through each channel region, using a BS receive beam that is mapped to the channel region.

Although only two resource areas 610 and 620 are assumed to be multiplexed in the frequency domain in FIG. 6B, the resource areas 610 and 620 can be multiplexed even in the time domain. If time multiplexing is applied, the resource area 620 for other control channels or data channels can be placed in another time domain, while occupying a frequency band where it is the same as or different from or at least partially overlaps the FBCH resource area 610 in the UL interval 606. The resource area 620 is divided into multiple channel regions that are mapped to beams in different directions, as described above.

Figure 7:
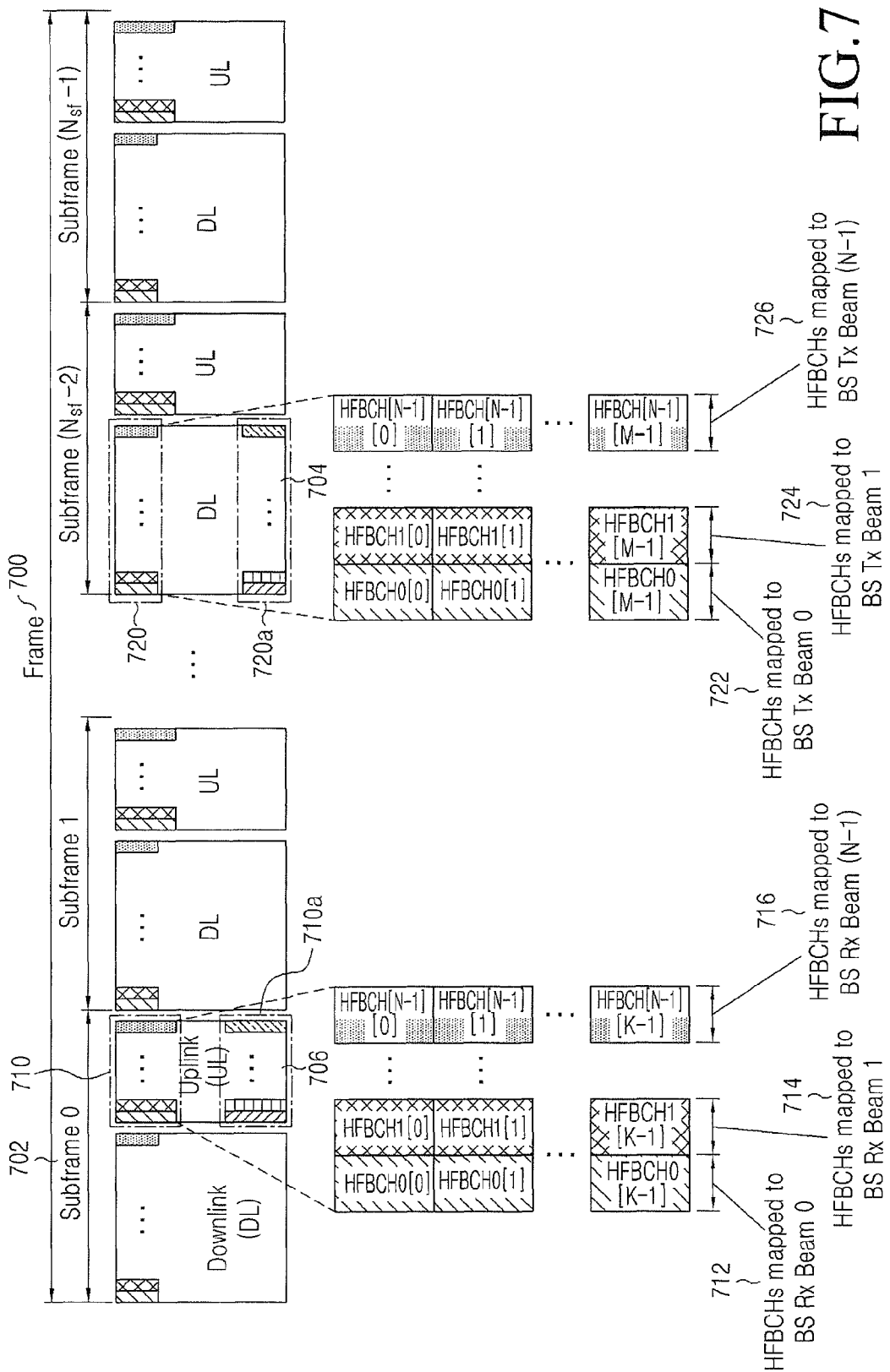
FIG. 7 illustrates a frame structure for beam-formed HFBCHs according to further another embodiment of the present disclosure.

FIG. 7 illustrates a frame structure for beam-formed HFBCHs according to further another embodiment of the present disclosure.

Referring to FIG. 7, a frame 700 is comprised of $N_{sf}$ subframes 702, and each subframe 702 includes a DL interval 704 and a UL interval 706, which are separated by a switching gap. A predetermined resource area 710 in the UL interval 706 is allocated for transmitting UL HFBCHs used to transmit an ACK/NACK indicating the decoding results for a DL HARQ burst including DL data. In addition, a predetermined resource area 720 in the DL interval 704 is allocated for transmitting DL HFBCHs used to transmit an ACK/NACK indicating the decoding results for a UL HARQ burst including UL data.

An HFBCH is used to perform an HARQ process-based retransmission operation by feeding back the success/fail in decoding a received HARQ burst, to a transmitter with an ACK/NACK response. Therefore, a UL/DL HFBCH has a predetermined mapping relationship with a DL/UL HARQ burst. Allocation of HFBCH resources depending on the mapping relationship between a UL/DL HFBCH and a DL/UL HARQ burst is determined taking into account a feedback delay time (ACK delay) that is determined considering the processing time required for decoding or scheduling. In addition, under the frame structure that is determined considering the best BS transmit beam for a DL and the best BS receive beam for a UL for each MS, allocation of HFBCH resources is determined by automatically mapping allocation locations of HFBCHs depending on the predetermined mapping rule on the basis of the allocation locations or order of HARQ bursts, or determined according to the scheduling by the BS depending on the implementation. The determination of mapping rules or the scheduling of HFBCHs is achieved considering the locations of DL/UL resource areas for transmitting/receiving DL/UL HARQ bursts with BS transmit/receive beams, and UL/DL resource areas for receiving/transmitting UL/DL HFBCHs with the BS receive/transmit beams as a decoding result response thereto.

The resource area 710 allocated in the UL interval 706 is divided into multiple channel regions 712, 714 and 716, and the channel regions 712, 714 and 716 are mapped to multiple BS receive beams that the BS can use for UL reception. The number of channel regions 712, 714 and 716 can be limited to the number of BS receive beams. As an example, the channel regions 712, 714 and 716 occupy the whole or some of a frequency band of the UL interval 706, and are separated in the time domain. Each of the channel regions 712, 714 and 716 refers to one UL HFBCH region. Specifically, the first channel region HFBCH0 712 is mapped to a BS receive beam #0, the second channel region HFBCH1 714 is mapped to a BS receive beam #1, and the N-th channel region HFBCH(N−1) 716 is mapped to a BS receive beam #(N−1). As an option, at least some of channel regions can be mapped to one or more BS receive beams to indicate one or more best BS receive beams.

A BS groups MSs having UL HFBCHs that are allocated to the same BS receive beam, and allocates, to the grouped MSs, HFBCHs in UL HFBCH regions that are mapped to the same BS receive beam. In the illustrated example, each of the UL HFBCH regions 712, 714 and 716 includes K HFBCHs that can be allocated to MSs mapped to the BS receive beam, in order to transmit ACK/NACK responses for a maximum of K DL HARQ bursts. As an example, HFBCH0[k] refers to a UL HFBCH that is included in the HFBCH0 712, and mapped to its associated (k+1)-th DL HARQ burst in the order of the time domain and frequency domain or in the order that is determined depending on the specific criteria, with respect to HARQ bursts of MSs having a first BS receive beam as the best BS receive beam in UL transmission among the DL HARQ bursts allocated in a preceding subframe, and HFBCH(N−1)[K−1] refers to a UL HFBCH that is included in the HFBCH(N−1) 716, and mapped to its associated k-th DL HARQ burst in the predetermined order among the DL HARQ bursts that are allocated to MSs having an N-th BS receive beam as the best BS receive beam in UL transmission. Each MS can transmit an ACK/NACK response over its associated UL HFBCH, and the BS can receive the ACK/NACK response using the BS receive beam that is mapped to an HFBCH region to which the HFBCH belongs.

Similarly, the resource area 720 allocated in the DL interval 704 is divided into multiple channel regions 722, 724 and 726, and the channel regions 722, 724 and 726 are mapped to multiple BS transmit beams that the BS can use for DL transmission. The number of channel regions 722, 724 and 726 can be limited to the number of BS transmit beams. As an example, the channel regions 722, 724 and 726 occupy the whole or some of a frequency band of the DL interval 704, and are separated in the time domain. Each of the channel regions 722, 724 and 726 refers to one DL HFBCH region. Specifically, the first channel region HFBCH0 722 is mapped to a BS transmit beam #0, the second channel region HFBCH1 724 is mapped to a BS transmit beam #1, and the N-th channel region HFBCH(N−1) 726 is mapped to a BS transmit beam #(N−1). As an option, at least some of channel regions can be mapped to one or more BS transmit beams to indicate one or more best BS transmit beams.

A BS groups MSs, which are the destinations to which it transmits DL HFBCHs with the same BS transmit beam, and allocates, to the grouped MSs, HFBCHs in DL HFBCH regions that are mapped to the same BS transmit beam. In the illustrated example, each of the DL HFBCH regions 722, 724 and 726 includes M HFBCHs that can be allocated to MSs mapped to the BS transmit beam, in order to transmit ACK/NACK responses for a maximum of M UL HARQ bursts. As an example, HFBCH0[m] refers to a DL HFBCH that is included in the HFBCH0 722, and mapped to its associated (m+1)-th UL HARQ burst in the order of the time domain and frequency domain or in the order that is determined depending on the specific criteria, with respect to HARQ bursts of MSs having a first BS transmit beam as the best BS transmit beam in DL transmission among the UL HARQ bursts allocated in a preceding subframe, and HFBCH(N−1)[M−1] refers to a DL HFBCH that is included in the HFBCH(N−1) 726, and mapped to its associated k-th UL HARQ burst in the predetermined order among the UL HARQ bursts that are allocated to MSs having an N-th BS transmit beam as the best BS transmit beam in DL transmission. The BS can transmit an ACK/NACK response over its associated DL HFBCH, and each MS can receive the ACK/NACK response using the BS transmit beam that is mapped to an HFBCH region to which the HFBCH belongs.

An HFBCH is used to transmit, through a DL/UL, an ACK or NACK response that indicates the decoding results on a UL/DL data burst or indicates whether decoding of the UL/DL data burst is successful. Therefore, a UL/DL HFBCH has a mapping relationship with a DL/UL HARQ burst, which is the target for an ACK/NACK decision. In the system operating based on beamforming, a UL HFBCH and a UL HARQ burst are received at the BS using the best BS receive beam for the MS, and a DL HFBCH and a DL HARQ burst are transmitted from the BS using the best BS transmit beam for the MS.

As an option, if the resource area 710 occupies some of the frequency band of the UL interval 706, the rest of the frequency band can be used for a control channel(s) that is generated through an RF chain(s), which is different from that of the resource area 710, or for a data channel(s) that is generated through an RF chain(s), which is the same as or different from that of the resource area 710. As an example, some lower part of the frequency band of the UL interval 706 can be used for the first resource area 710 for ACK/NACK responses, and some higher part of the frequency band of the same time interval can be used for a second resource area 710a for other control channels (or data channels). As another example, the second resource area 710a can be used for UL data transmission by one or more MSs. Similarly, the second resource area 710a is divided, in the time domain, into multiple channel regions that are mapped to multiple BS receive beams, and one channel region includes multiple unit areas that can be allocated to one or more MSs. The channel regions of the second resource area 710a are mapped to the BS receive beams.

As an option, if the resource area 720 in a DL interval 704 occupies some of the frequency band of the DL interval 704, the rest of the frequency band can be used for a control channel(s) that is generated through an RF chain(s), which is different from that of the resource area 720, or for a data channel(s) that is generated through an RF chain(s), which is the same as or different from that of the resource area 720. As an example, some lower part of the frequency band of the DL interval 704 can be used for the first resource area 720 for ACK/NACK responses, and some higher part of the frequency band of the same time interval can be used for a second resource area 720a for other control channels. As another example, the second resource area 720a can be used for DL data transmission for one or more MSs. Similarly, the second resource area 720a is divided, in the time domain, into multiple channel regions that are mapped to multiple BS transmit beams, and each channel region includes multiple unit areas that can be allocated to one or more MSs. The channel regions of the second resource area 720a are mapped to the BS transmit beams.

Although the resource areas 710 and 710a in the UL interval 706 are assumed to be multiplexed in the frequency domain in FIG. 7, the resource areas 710 and 710a can be multiplexed even in the time domain. If time multiplexing is applied, the resource area 710a for other control channels or data channels can be placed in another time domain, while occupying a frequency band where it is the same as or different from or at least partially overlaps the resource area 710 in the UL interval 706. The resource area 710a is divided into multiple channel regions that are mapped to beams in different directions, as described above.

Similarly, the resource areas 720 and 720a in the DL interval 704 can be multiplexed in the time domain. If time multiplexing is applied, the resource area 720a for other control channels or data channels can be placed in another time domain, while occupying a frequency band where it is the same as or different from or at least partially overlaps the resource area 710 in the DL interval 704. The resource area 720a is divided into multiple channel regions that are mapped to beams in different directions, as described above.

Figure 8:
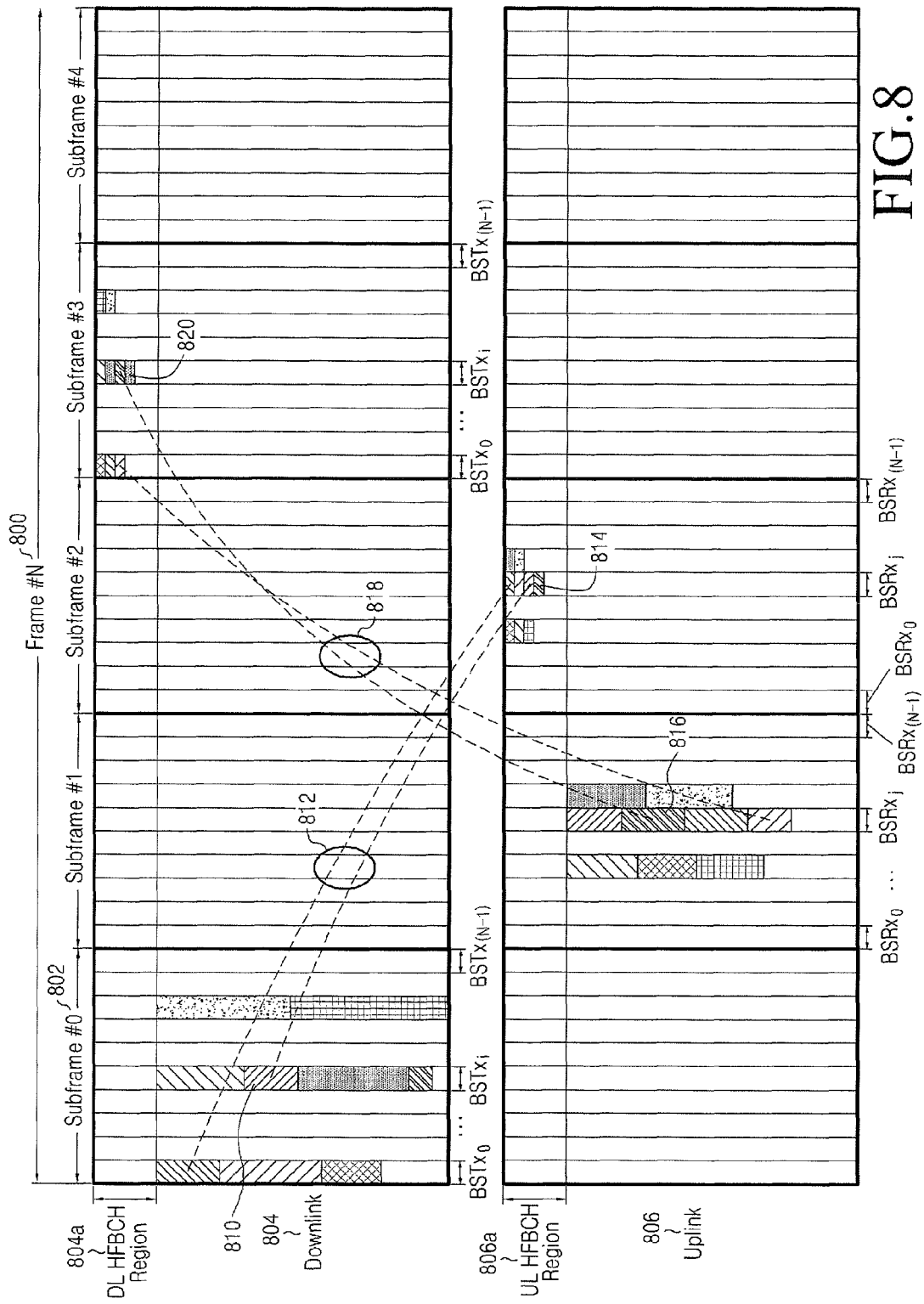
FIG. 8 illustrates resource allocation for HARQ bursts and HFBCHs according to an embodiment of the present disclosure.

FIG. 8 illustrates resource allocation for HARQ bursts and HFBCHs according to an embodiment of the present disclosure. In the illustrated example, UL/DL HARQ bursts, which are transmitted depending on the UL/DL HARQ operation, and DL/UL HFBCH resources, which are mapped for transmission of ACK/NACK responses thereto, are allocated. Herein, a FDD frame structure is illustrated, and it is assumed that one subframe is required as a processing time for decoding and scheduling a received HARQ burst.

Referring to FIG. 8, a DL interval 804 includes a DL HFBCH region 804a capable of carrying multiple HFBCHs, and a UL interval 806 includes a UL HFBCH region 806a capable of carrying multiple HFBCHs.

An MS MS_k has an i-th transmit beam TxBeam#i of the BS as the best BS transmit beam, for a DL, and has a j-th receive beam RxBeam#j of the BS as the best BS receive beam, for a UL. The BS performs scheduling that is determined considering HARQ feedback timing, taking into account the resources that correspond to the best BS transmit/receive beams of the MS MS_k. Depending on the scheduling, the BS transmits a DL HARQ burst 810 for MS_k, using its TxBeam#i in a subframe #0 of the DL interval 804. The DL HARQ burst 810 can be transmitted through a slot that is mapped to TxBeam#j in the subframe #0. A UL ACK/NACK response 814 corresponding to the DL HARQ burst 810 is received at the BS using the BS's RxBeam#j in a subframe #2 of the UL interval 806. The UL ACK/NACK response 814 can be transmitted through RxBeam#j in the subframe #2 and a resource area that is mapped to MS_k.

In an embodiment, a resource area for HFBCHs, over which the UL ACK/NACK response 814 corresponding to the DL HARQ burst 810 is transmitted, can be determined depending on a predetermined mapping rule 812. As an example, the mapping rule 812 defines a mapping relationship between BS transmit beams, through which DL HARQ bursts can be transmitted, and BS receive beams, through which their associated UL HFBCHs can be received. Based on the mapping rule 812, the BS determines a resource area of HFBCHs to be used to receive the UL ACK/NACK response 814, depending on the size, location and order of the allocation area where the DL HARQ burst 810 is to be transmitted, and the BS transmit beam index.

An MS MS_m has a j-th receive beam RxBeam#j of the BS as the best BS receive beam, for a UL, and has an i-th transmit beam TxBeam#i of the BS as the best BS transmit beam, for a DL. For the MS_m, the BS allocates UL resources in the UL interval 806 where a j-th receive beam of the BS is operated. Depending on the resource allocation, the BS receives a UL HARQ burst 816 from the MS_m through the BS's RxBeam#j in a subframe #1 of the UL interval 806. The UL HARQ burst 816 can be transmitted through a slot that is mapped to the RxBeam#j in the subframe #1. A DL ACK/NACK response 820 for the UL HARQ burst 816 is transmitted to the MS_m through the HFBCH that is mapped to a BS's TxBeam#i in a subframe #3 of the DL interval 804, using the BS's TxBeam#i. The DL ACK/NACK response 820 can be transmitted through a slot that is mapped to the TxBeam#i in the subframe #3.

In an embodiment, a resource area for HFBCHs, over which the DL ACK/NACK response 820 corresponding to the UL HARQ burst 816 is transmitted, can be determined depending on a predetermined mapping rule 818. As an example, the mapping rule 818 defines a mapping relationship between BS receive beams, through which UL HARQ bursts can be received, and BS transmit beams, through which their associated DL HFBCHs can be transmitted. Based on the mapping rule 818, the BS determines a resource area of HFBCHs to be used to transmit the DL ACK/NACK response 820, depending on the size, location and order of the allocation area where the UL HARQ burst 816 is received, and the BS receive beam index.

When the BS and the MS are sharing information about the best BS transmit/receive beams for the MS, the BS can implicitly determine information about the UL/DL BS receive/transmit beams mapped to the HARQ burst based on the size, location and order of the allocation area of the DL/UL HARQ burst, and the BS transmit/receive beam information, and can determine the HFBCH allocation location in the HFBCH region mapped thereto.

In an alternative embodiment, the BS can perform scheduling considering the best transmit/receive beam information for each MS, and can explicitly inform the MS of the HFBCH resources that are allocated according to the scheduling results.

Although the scheduling and resource allocation for FBCHs and HFBCHs have been described so far, the scheduling and resource allocation can be applied even to other UL/DL control channels.

Figure 9A:
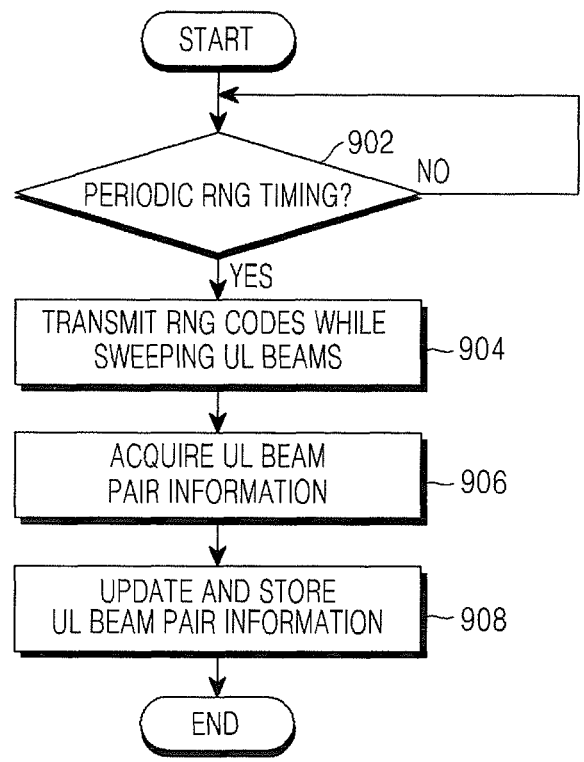
FIGS. 9A to 9C are flowcharts illustrating an MS's operation of transmitting and receiving control channels according to an embodiment of the present disclosure.
Figure 9B:
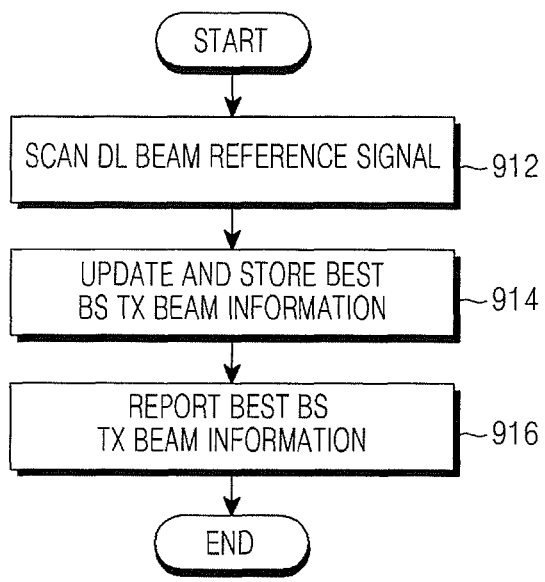
Figure 9C:
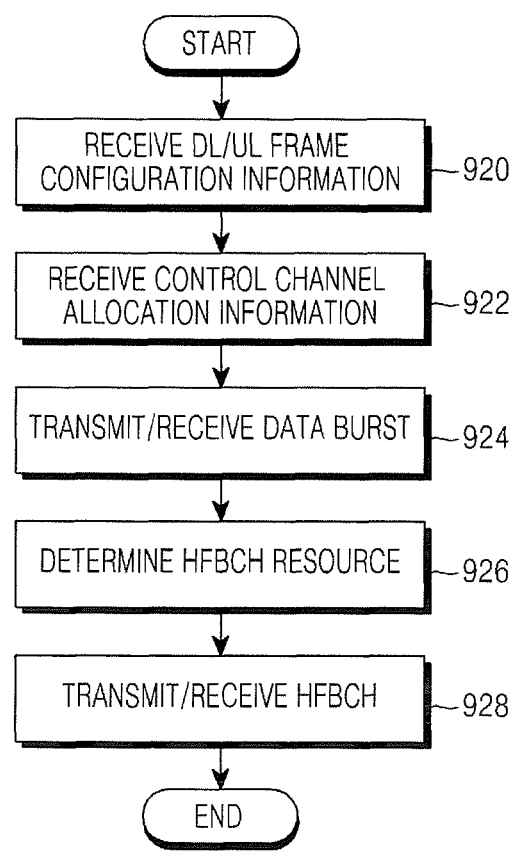

FIGS. 9A to 9C are flowcharts illustrating an MS's operation of transmitting and receiving control channels according to an embodiment of the present disclosure.

Referring to FIG. 9A, the MS determines in step 902 whether periodic ranging (RNG) timing has come, and if the periodic RNG timing has come, the MS performs UL beam tracking in step 904. Although it will be assumed herein that the ranging procedure for UL beam tracking is performed periodically, the UL beam tracking can be performed at predetermined intervals, or can be performed periodically or aperiodically depending on the predetermined conditions. The predetermined conditions include, for example, at least one of initial network entry and handover execution.

In step 904, the MS transmits a reference signal (for example, a ranging code) through each MS transmit beam in a designated UL resource area while sweeping MS transmit beams. A BS receives reference signals transmitted through MS transmit beams, through BS receive beams, and determines one or more best UL beam pairs by measuring the channel state for each beam pair.

In step 906, the MS receives UL beam pair information indicating the best UL beam pairs representative of one or more best beam pairs selected by the BS, from the BS in response to the reference signals that it transmitted. The UL beam pair information indicates the best beam pair of MS transmit beams and BS receive beams for a UL. As an example, this information includes at least one best MS transmit beam index and its associated at least one best BS receive beam index. In step 908, the MS stores the received UL beam pair information, or updates the previous information if there is previous UL beam pair information stored in advance. The MS reads and outputs the stored UL beam pair information, if that is required for transmission and reception of control channels.

Referring to FIG. 9B, in step 912, the MS scans DL reference signals through MS receive beams at predetermined intervals, or scans the signals periodically or aperiodically depending on the predetermined conditions. The MS measures the channel state for the pairs with MS receive beams by scanning the DL reference signals for each BS transmit beam. In step 914, the MS determines the best BS transmit beams depending on the channel measurement results, and stores information about the best BS transmit beams or updates previous information if there is previous information stored in advance. In step 916, the MS reports the best BS transmit beam information to the BS, if necessary. The best BS transmit beam information includes, for example, at least one BS transmit beam index. The MS reads and outputs the stored best BS transmit beam information, if that is required for transmission and reception of control channels.

Referring to FIG. 9C, the MS receives DL/UL frame configuration information broadcasted from the BS, in step 920. As an example, the DL/UL frame configuration information can indicate control channel regions that are mapped to all of BS's transmit/receive beams. Specifically, this information indicates to which BS's transmit/receive beam each control channel region is mapped. In step 922, the MS receives control channel allocation information indicating control channel resource allocation that is determined considering the best UL beam pair and the best BS transmit beams, which are determined by the MS. The control channel allocation information includes allocation information for UL/DL control channels illustrated in FIGS. 5 to 7, and as an option, the control channel allocation information can further indicate the mapping rule between the HARQ burst resource area and ACK/NACK response resource area as shown in FIG. 8. The control channel resource area indicated by the control channel allocation information is mapped to BS transmit/receive beams through which each control channel is transmitted. The control channel allocation information indicates a control channel region(s) that is part of the resource area that is mapped to the best BS transmit/receive beams for an MS in the entire control channel resource area.

In step 924, a DL HARQ burst is received at the MS, or a UL HARQ burst is transmitted from the MS. In step 926, the MS determines control channel resources (i.e., an HFBCH region) to be used to transmit/receive a UL/DL ACK/NACK response corresponding to the DL/UL HARQ burst based on the control channel allocation information and the resource area used for transmission and reception of the DL/UL HARQ burst. In step 928, the MS transmits a UL ACK/NACK response corresponding to the DL HARQ burst to the BS through the determined HFBCH region, or receives a DL ACK/NACK response corresponding to the UL HARQ burst from the BS through the determined HFBCH region.

Figure 10:
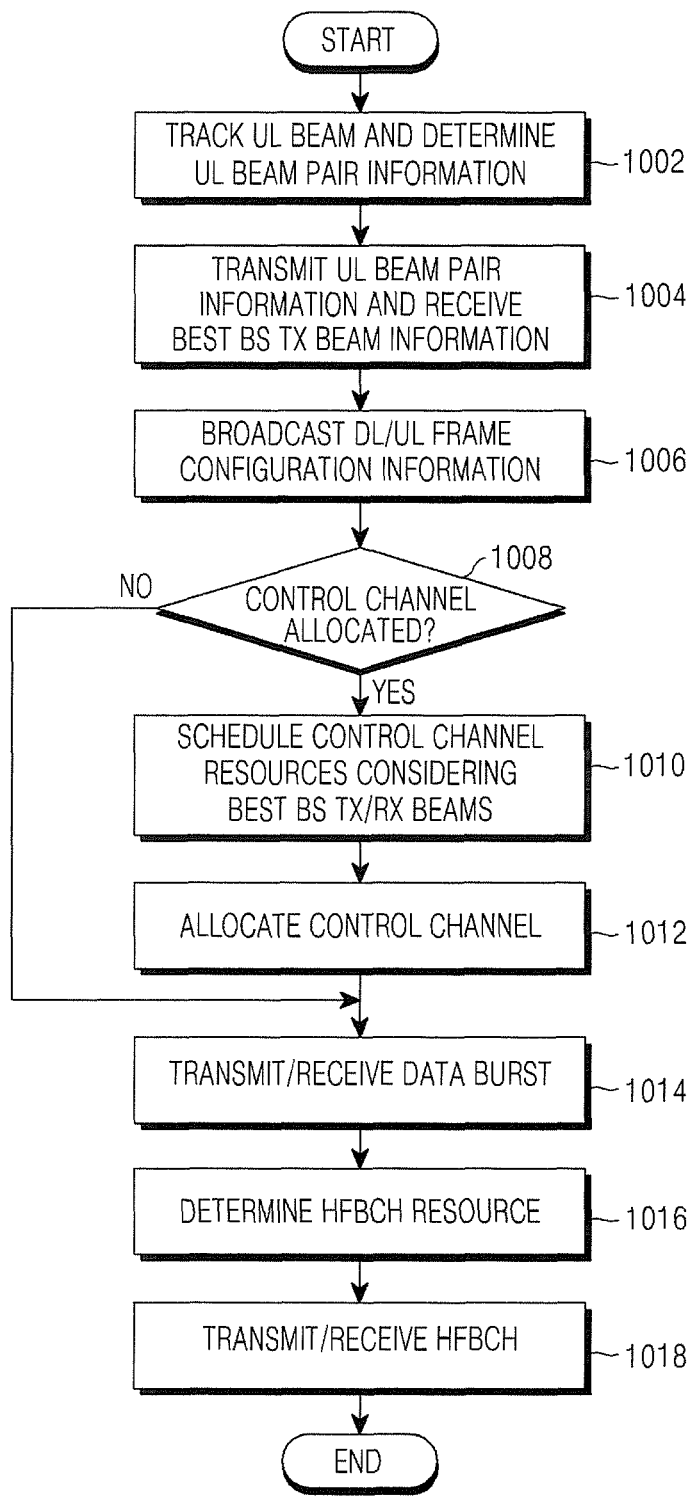
FIG. 10 is a flowchart illustrating a BS's operation of transmitting and receiving control channels according to an embodiment of the present disclosure.

FIG. 10 is a flowchart illustrating a BS's operation of transmitting and receiving control channels according to an embodiment of the present disclosure.

Referring to FIG. 10, in step 1002, the BS receives reference signals transmitted from an MS through each pair of MS transmit beams and BS receive beams in a beam tracking operation that is performed periodically or aperiodically, and determines the best beam pair of MS transmit beams and BS receive beams for the MS depending on the measurement results on the received signals. In step 1004, the BS transmits UL beam pair information indicating the best UL beam pair, to the MS, and receives best BS transmit beam information indicating the best BS transmit beams determined by the MS, from the MS.

In step 1006, the BS broadcasts DL/UL frame configuration information to MSs in its cell. As an example, the DL/UL frame configuration information can indicate control channel regions that are mapped to all of BS's transmit/receive beams. Specifically, this information indicates to which BS's transmit/receive beam each control channel region is mapped. The BS can not need to transmit allocation information for control channels, if it can estimate the control channel regions and the types of their associated control channels based on the DL/UL frame configuration information.

The BS determines in step 1008 whether it needs to allocate control channels for the MS, and if needed, the BS schedules control channel resources based on the best BS transmit/receive beams for the MS in step 1010. In step 1012, the BS transmits information (control channel allocation information) about control channel resources allocated by the scheduling, to the MS. The control channel resource area indicated by the control channel allocation information is mapped to the BS transmit/receive beams through which each control channel is transmitted. In other words, the BS allocates, for an MS, a control channel region that is a part of the resource area that is mapped to the best BS transmit/receive beams for the MS in the entire control channel resource area, and indicates the allocated control channel region using the control channel allocation information.

In step 1014, the BS transmits a DL HARQ burst to the MS, or receives a UL HARQ burst from the MS. In step 1016, the BS determines control channel resources (i.e., an HFBCH region) to be used to transmit a UL/DL ACK/NACK response corresponding to the DL/UL HARQ burst based on the control channel allocation information and the resource area used for transmission and reception of the DL/UL HARQ burst. In step 1018, the BS receives a UL ACK/NACK response corresponding to the DL HARQ burst from the MS through the determined HFBCH region, or transmits a DL ACK/NACK response corresponding to the UL HARQ burst to the MS through the determined HFBCH region.

Figure 11:
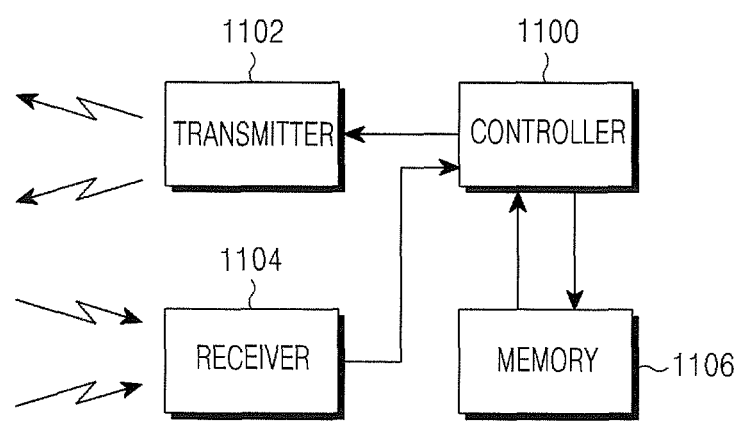
FIG. 11 is a block diagram illustrating a structure of a BS/MS for performing UL resource allocation according to an embodiment of the present disclosure.

FIG. 11 is a block diagram illustrating a structure of a BS/MS for performing UL resource allocation according to an embodiment of the present disclosure.

If the structure of FIG. 11 is applied to an MS, a transmitter 1102, under control of a controller 1100, transmits a reference signal through each MS transmit beam while sweeping MS transmit beams, and transmits, to a BS, a UL HARQ burst or a UL ACK/NACK response, which are provided from the controller 1100. A receiver 1104, under control of the controller 1100, receives a DL HARQ burst or a DL ACK/NACK response from the BS, and provides them to the controller 1100. The controller 1100 stores UL beam pair information and best BS transmit beam information in a memory 1106, performs beamforming for UL transmission and DL reception, determines resource areas where control channels such as UL/DL ACK/NACK response are transmitted and received, based on the best beam information acquired through the UL/DL beam tracking procedure, and controls operations of the transmitter 1102 and the receiver 1104 depending on the determination results.

If the structure of FIG. 11 is applied to a BS, the receiver 1104, under control of the controller 1100, receives reference signals transmitted through MS transmit beams, and provides them to the controller 1100. The receiver 1104 receives a UL HARQ burst or a UL ACK/NACK response from an MS, and provides them to the controller 1100. The transmitter 1102 transmits a DL HARQ burst or a DL ACK/NACK response provided from the controller 1100, to the MS. The controller 1100 stores information about the best BS transmit/receive beams, which is received from the MS, in the memory 1106, performs beamforming for UL reception and DL transmission, and schedules resource allocation for UL/DL control channels. In particular, the controller 1100 determines resource areas where control channels such as UL/DL ACK/NACK response are transmitted and received, based on the best beam information acquired through the UL/DL beam tracking procedure, and controls operations of the transmitter 1102 and the receiver 1104 depending on the determination results.

As is apparent from the foregoing description, the method and apparatus provided by the disclosed embodiments of the present disclosure effectively configures a frame considering the multiple BS transmit/receive beams and the best BS transmit/receive beams for each MS, for transmission and reception of control channels that use small-sized resources that are transmitted and received by beamforming, efficiently groups control channel resources for multiple MSs, and allocates appropriate control channels to each MS in the mmWave-band wireless mobile communication system, thereby improving the transmission/reception efficiency of control channels.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method to receive control information, the method performed by a base station (BS) in a wireless communication system, the method comprising:
   selecting a BS receive beam for uplink communication with a mobile station (MS), wherein the selected BS receive beam is one of a plurality of BS receive beams formed by an antenna array of the BS, and the plurality of BS receive beams have different beam directions and different beam coverages;
   identifying a control channel resource region mapped to the selected BS receive beam from among a plurality of control channel resource regions in an uplink interval, wherein the uplink interval is configured for a control channel and includes the plurality of control channel resource regions corresponding to the plurality of BS receive beams respectively, and the plurality of control channel resource regions are divided on a time domain or a frequency domain in the uplink interval; and
   receiving the control information from the MS on the identified control channel resource region through the selected BS receive beam.

2. The method of claim 1, wherein each of the control channel resource regions is allocated to one or more MSs having a same BS receive beam for uplink communication.

3. The method of claim 1, wherein the control channel resource regions are multiplexed with at least one resource region for other channels in the uplink interval on a time domain or a frequency domain.

4. The method of claim 1, further comprising:
   transmitting a downlink data burst to the MS; and
   receiving, from the MS, feedback information corresponding to the downlink data burst over an uplink feedback channel in an uplink feedback resource region, wherein the uplink feedback resource region and the uplink feedback channel are determined corresponding to the downlink data burst using the selected BS receive beam.

5. A method to transmit control information, the method performed by a base station (BS) in a wireless communication system, comprising:
   receiving, from a mobile station (MS), information about BS transmit beam selected for downlink communication with the MS, wherein the selected BS transmit beam is one of a plurality of BS transmit beams formed by an antenna array of the BS and the plurality of BS transmit beams have different beam directions and different beam coverages;
   identifying a control channel resource region mapped to the selected BS transmit beam from among a plurality of control channel resource regions in a downlink interval, wherein the downlink interval is configured for a control channel and includes the plurality of control channel resource regions corresponding to the plurality of BS transmit beams respectively, and the control channel resource regions are divided on a time domain and/or a frequency domain in the downlink interval; and
   transmitting the control information to the MS on the identified control channel resource region through the selected BS transmit beam.

6. The method of claim 5, wherein each of the control channel resource regions is allocated to one or more MSs having a same BS transmit beam for downlink communication.

7. The method of claim 5, wherein the control channel resource regions are multiplexed with at least one resource region for other channels in the downlink interval on a time domain or a frequency domain.

8. The method of claim 5, further comprising:
   receiving an uplink data burst from the MS;
   determining a downlink feedback resource region and a downlink feedback channel in the downlink feedback resource region corresponding to the uplink data burst using the selected BS transmit beam; and
   transmitting, to the MS, feedback information corresponding to the uplink data burst over the downlink feedback channel on the determined downlink feedback resource region.

9. A communication apparatus in a base station (BS) to receive control information in a wireless communication system, the communication apparatus comprising:
   a transceiver; and
   a controller configured to:
      control the transceiver,
      select a BS receive beam for uplink communication with a mobile station (MS), wherein the selected BS receive beam is one of a plurality of BS receive beams formed by an antenna array of the BS, and the plurality of BS receive beams have different beam directions and different beam coverages, and
      identify a control channel resource region mapped to the selected BS receive beam from among a plurality of control channel resource regions in an uplink interval, wherein the uplink interval is configured for a control channel and includes the plurality of control channel resource regions corresponding to the plurality of BS receive beams respectively and the control channel resource regions are divided on a time domain and/or a frequency domain in the uplink interval,
   wherein the transceiver is configured to receive control information from the MS on the identified control channel resource region through the selected BS receive beam.

10. The communication apparatus of claim 9, wherein each of the control channel resource regions is allocated to one or more MSs having a same BS receive beam for uplink communication.

11. The communication apparatus of claim 9, wherein the control channel resource regions are multiplexed with at least one resource region for other channels in the uplink interval on a time domain or a frequency domain.

12. The communication apparatus of claim 9, wherein the transceiver is further configured to transmit a downlink data burst to the MS, and receive, from the MS, feedback information corresponding to the downlink data burst over an uplink feedback channel in a feedback resource region.

13. The communication apparatus of claim 9, wherein the transceiver comprises:
- a plurality of encoders configured to encode input information;
- a plurality of modulators configured to map the information encoded by the encoders to modulation symbols;
- a multiple input multiple output (MIMO) encoder configured to convert modulation symbol sequences comprised of the modulation symbols into a plurality of MIMO streams;
- a precoder configured to convert the MIMO streams into precoded streams corresponding to a plurality of antenna arrays comprised of a plurality of antenna elements to beamform using a predetermined precoding matrix;
- radio frequency (RF) paths configured to convert the precoded streams into analog RF signals; and
- beamforming units configured to adjust a phase and an amplitude of the analog RF signals according to the antenna arrays and the antenna elements and transmit the adjusted RF signals through the antenna elements of the antenna arrays.

14. A communication apparatus in a base station (BS) to transmit control information in a wireless communication system, comprising:
- a transceiver; and
- a controller configured to:
    - control the transceiver,
    - receive, from a mobile station (MS), information about a BS transmit beam selected for downlink communication with the MS, wherein the selected BS transmit beam is one of a plurality of BS transmit beams formed by an antenna array of the BS and the plurality of BS transmit beams have different beam directions and different beam coverages,
    - identify a control channel resource region mapped to the selected BS transmit beam from among a plurality of control channel resource regions in a downlink interval, wherein the downlink interval is configured for a control channel and includes the plurality of control channel resource regions corresponding to the plurality of BS transmit beams respectively, and the control channel resource regions are divided on a time domain and/or a frequency domain in the downlink interval, and
    - control the transceiver to transmit the control information to the MS on the identified control channel resource region through the selected BS transmit beam.

15. The communication apparatus of claim 14, wherein each of the control channel resource regions is allocated to one or more MSs having a same BS transmit beam for downlink communication.

16. The communication apparatus of claim 14, wherein the control channel resource regions are multiplexed with at least one resource region for other channels in the downlink interval on a time domain or a frequency domain.

17. The communication apparatus of claim 14, wherein the transceiver is further configured to receive an uplink data burst from the MS, wherein the controller is further configured to determine a downlink feedback resource region and a downlink feedback channel in the downlink feedback resource region corresponding to the uplink data burst using the selected BS transmit beam, and wherein the transceiver is further configured to transmit, to the MS, feedback information corresponding to the uplink data burst over the downlink feedback channel on the determined downlink feedback resource region.

18. The communication apparatus of claim 14, wherein the transceiver comprises:
- a plurality of encoders configured to encode input information;
- a plurality of modulators configured to map the information encoded by the encoders to modulation symbols;
- a multiple input multiple output (MIMO) encoder configured to convert modulation symbol sequences comprised of the multiple modulation symbols into multiple MIMO streams;
- a precoder configured to convert the MIMO streams into precoded streams corresponding to multiple antenna arrays comprised of multiple antenna elements to beamform using a predetermined precoding matrix;
- radio frequency (RF) paths configured to convert the precoded streams into analog RF signals; and
- beamforming units configured to adjust a phase and an amplitude of the analog RF signals according to the antenna arrays and the antenna elements and transmit the adjusted RF signals through the antenna elements of the antenna arrays.

19. A method to transmit control information, the method performed by a mobile station (MS) in a wireless communication system, the method comprising:
- receiving, from a base station (BS), information on a BS receive beam selected for uplink communication with the BS, wherein the selected BS receive beam is one of a plurality of BS receive beams formed by an antenna array of the BS and the plurality of BS receive beams have different beam directions and different beam coverages;
- identifying a control channel resource region mapped to the selected BS receive beam from among a plurality of control channel resource regions in a uplink interval, wherein the uplink interval is configured for a control channel and includes the plurality of control channel resource regions corresponding to the plurality of BS receive beams respectively, and the plurality of control channel resource regions are divided on a time domain and/or a frequency domain in the uplink interval; and
- transmitting control information on the identified control channel resource region through the selected BS receive beam.

20. The method of claim 19, wherein each of the control channel resource regions is allocated to one or more MSs having a same BS receive beam for uplink communication.

21. The method of claim 19, wherein the control channel resource regions are multiplexed with at least one resource region for other channels in the uplink interval on a time domain or a frequency domain.

22. The method of claim 19, further comprising:
- receiving a downlink data burst from the BS;
- determining an uplink feedback resource region and an uplink feedback channel corresponding to the downlink data burst using the selected BS receive beam; and
- transmitting feedback information corresponding to the downlink data burst over the uplink feedback channel in the uplink feedback resource region.

23. A method to receive control information, the method performed by a mobile station (MS) in a wireless communication system, comprising:
- selecting a base station (BS) transmit beam for downlink communication with a BS, wherein the selected BS transmit beam is one of a plurality of BS transmit beams formed by an antenna array of the BS and the plurality of BS transmit beams have different beam directions and different beam coverages;

identifying a control channel resource region mapped to the selected BS transmit beam from among a plurality of control channel resource regions in a downlink interval, wherein the downlink interval is configured for a control channel and includes the plurality of control channel resource regions corresponding to the plurality of BS transmit beams respectively, and the control channel resource regions are divided on a time domain and/or a frequency domain in the downlink interval; and receiving control information from the BS on the identified control channel resource region through the selected BS transmit beam.

24. The method of claim 23, wherein each of the control channel resource regions is allocated to one or more MSs having a same BS transmit beam for downlink communication.

25. The method of claim 23, wherein the control channel resource regions are multiplexed with at least one resource region for other channels in the downlink interval on a time domain or a frequency domain.

26. The method of claim 23, further comprising:
transmitting an uplink data burst to the BS; and
receiving, from the BS, feedback information corresponding to the uplink data burst over a downlink feedback channel on a downlink feedback resource region, wherein the downlink feedback resource region and the downlink feedback channel in the downlink feedback resource region are determined corresponding to the uplink data burst using the selected BS transmit beam.

27. A communication apparatus in a mobile station (MS) to transmit control information by the MS in a wireless communication system, the communication apparatus comprising:
a transceiver configured to receive, from a base station (BS), information on a BS receive beam selected for uplink communication with the BS, wherein the selected BS receive beam is one of a plurality of BS receive beams formed by an antenna array of the BS and the plurality of BS receive beams have different beam directions and different beam coverages; and
a controller configured to identify a control channel resource region mapped to the selected BS receive beam from among a plurality of control channel resource regions in an uplink interval, wherein the uplink interval is configured for a control channel and includes the plurality of control channel resource regions corresponding to the plurality of BS receive beams respectively and the control channel resource regions are divided on a time domain and/or a frequency domain in the uplink interval; and
wherein the transceiver is configured to transmit control information on the identified control channel resource region through the selected BS receive beam.

28. The communication apparatus of claim 27, wherein each of the control channel resource regions is allocated to one or more MSs having a same BS receive beam for uplink communication.

29. The communication apparatus of claim 27, wherein the control channel resource regions are multiplexed with at least one resource region for other channels in the uplink interval on a time domain or a frequency domain.

30. The communication apparatus of claim 27, wherein the transceiver is further configured to receive a downlink data burst from the BS and transmit feedback information corresponding to a downlink data burst over a uplink feedback channel in a uplink feedback resource region, wherein the uplink feedback resource region and the uplink feedback channel are determined corresponding to the downlink data burst using the selected BS receive beam.

31. A communication apparatus in a mobile station (MS) to receive control information by the MS in a wireless communication system, the communication apparatus comprising:
a transceiver; and
a controller configured to:
control the transceiver,
select a base station (BS) transmit beam for downlink communication with a BS, wherein the selected BS transmit beam is one of a plurality of BS transmit beams formed by an antenna array of the BS and the plurality of BS transmit beams have different beam directions and different beam coverages, and
identify a control channel resource region mapped to the selected BS transmit beam from among a plurality of control channel resource regions in a downlink interval, wherein the downlink interval is configured for a control channel and includes the plurality of control channel resource regions corresponding to the plurality of BS transmit beams respectively, and the control channel resource regions are divided on a time domain and/or a frequency domain in the downlink interval,
wherein the transceiver is configured to receive control information from the BS on the identified control channel resource region through the selected BS transmit beam, and wherein the downlink interval is configured for a control channel and includes the plurality of control channel resource regions corresponding to the plurality of BS transmit beams respectively.

32. The communication apparatus of claim 31, wherein each of the control channel resource regions is allocated to one or more MSs having a same BS transmit beam for downlink communication.

33. The communication apparatus of claim 31, wherein the control channel resource regions are multiplexed with at least one resource region for other channels in the downlink interval on a time domain or a frequency domain.

34. The communication apparatus of claim 31, wherein the transceiver is further configured to transmit an uplink data burst to the BS, and receive, from the BS, feedback information corresponding to the uplink data burst over a downlink feedback channel on a downlink feedback resource region, wherein the downlink feedback resource region and the downlink feedback channel in the downlink feedback resource region are determined corresponding to the uplink data burst using the selected BS transmit beam.

* * * * *